United States Patent
Onishi et al.

(10) Patent No.: US 7,961,984 B2
(45) Date of Patent: Jun. 14, 2011

(54) IMAGE PROCESSING APPARATUS, COMPUTER READABLE MEDIUM AND COMPUTER DATA SIGNAL

(75) Inventors: Takeshi Onishi, Kanagawa (JP); Takashi Sonoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1092 days.

(21) Appl. No.: 11/785,329

(22) Filed: Apr. 17, 2007

(65) Prior Publication Data

US 2008/0095440 A1    Apr. 24, 2008

(30) Foreign Application Priority Data

Oct. 24, 2006   (JP) ................ P2006-289018

(51) Int. Cl.
G06K 9/32  (2006.01)
(52) U.S. Cl. ............ 382/297; 382/296
(58) Field of Classification Search ............... None
See application file for complete search history.

(56) References Cited

U.S. PATENT DOCUMENTS

| | | | |
|---|---|---|---|
| 6,302,329 B1 * | 10/2001 | Iwai et al. | 235/494 |
| 6,532,301 B1 * | 3/2003 | Krumm et al. | 382/170 |
| 6,857,571 B2 * | 2/2005 | Walmsley et al. | 235/462.1 |
| 6,859,155 B2 * | 2/2005 | Kondo et al. | 341/106 |
| 6,985,626 B2 * | 1/2006 | Mitsui | 382/201 |

FOREIGN PATENT DOCUMENTS

| | | | |
|---|---|---|---|
| JP | 2001-346032 A | 12/2001 | |
| JP | 2003-511763 T | 3/2003 | |
| JP | 2006-85679 A | 3/2006 | |
| WO | WO 01/26032 A1 | 4/2001 | |
| WO | WO 01/26033 A1 | 4/2001 | |
| WO | WO 01/26034 A1 | 4/2001 | |
| WO | WO 0126034 A1 * | 4/2001 | |

OTHER PUBLICATIONS

Takashi Sonoda et al., "Image Generation Apparatus, Image Processing Apparatus, Computer Readable Medium and Computer Data Signal," Unpublished U.S. Appl. No. 11/785,330, filed Apr. 17, 2007.

Takeshi Onishi et al., "Image Generation Apparatus, Computer Readable Medium, Computer Data Signal, Information Generation Method, Information Reading System, Electronic Pen and Recording Medium," Unpublished U.S. Appl. No. 11/785,333, filed Apr. 17, 2007.

Takeshi Onishi et al., "Image Generation Apparatus and Recording Medium," Unpublished U.S. Appl. No. 11/785,324, filed Apr. 17, 2007.

* cited by examiner

*Primary Examiner* — Samir A Ahmed
*Assistant Examiner* — Jayesh Patel
(74) *Attorney, Agent, or Firm* — Morgan, Lewis & Bockius LLP

(57) ABSTRACT

An image processing apparatus includes an image acquisition section, a combination detection section and an angle detection section. The image acquisition section acquires a code pattern image from a surface of a recording medium on which the code pattern is formed. In the code pattern, N unit images are selectively placed in M reference positions that are arranged at predetermined intervals in two directions orthogonal to each other where M≧4 and 2≦N<M. The combination detection section detects pairs of the unit images based on the predetermined intervals and respective positions of the unit images contained in the code pattern image acquired. The angle detection section detects a rotation angle of the code pattern image with respect to a predetermined reference axis based on an inclination of a line, with respect to the predetermined reference axis, connecting the unit images of each pair detected.

8 Claims, 20 Drawing Sheets

FIG. 4

| SYNCHRO-NOUS CODE | X POSITION CODE | X POSITION CODE | X POSITION CODE | X POSITION CODE |
|---|---|---|---|---|
| Y POSITION CODE | IDENTIFI-CATION CODE | IDENTIFI-CATION CODE | IDENTIFI-CATION CODE | IDENTIFI-CATION CODE |
| Y POSITION CODE | IDENTIFI-CATION CODE | IDENTIFI-CATION CODE | IDENTIFI-CATION CODE | IDENTIFI-CATION CODE |
| Y POSITION CODE | IDENTIFI-CATION CODE | IDENTIFI-CATION CODE | IDENTIFI-CATION CODE | IDENTIFI-CATION CODE |
| Y POSITION CODE | IDENTIFI-CATION CODE | IDENTIFI-CATION CODE | IDENTIFI-CATION CODE | IDENTIFI-CATION CODE |

OUTPUT DISTANCE BETWEEN DOTS AS THRESHOLD VALUE WHEN INTEGRATION VALUE OF FREQUENCIES IS EQUAL TO OR LARGER THAN NUMBER OF PAIRS OF REFERENCE DOTS

FIG. 17A
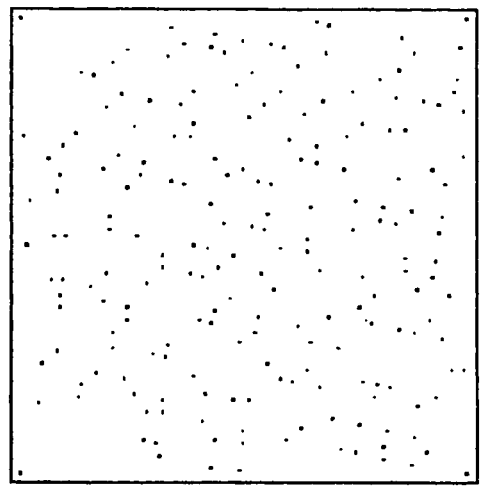
FIG. 17B
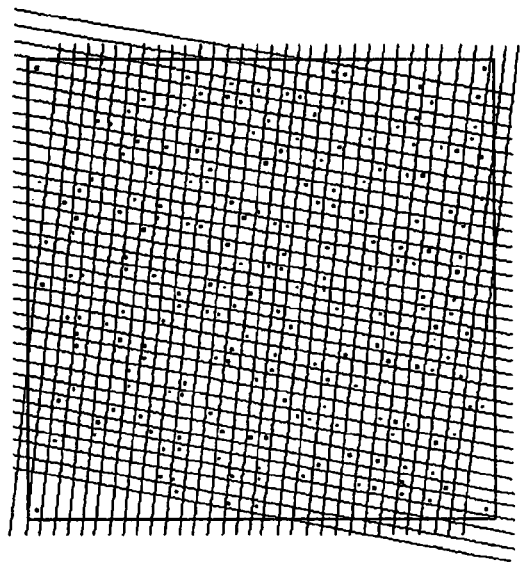
FIG. 17C

IMAGE PROCESSING APPARATUS, COMPUTER READABLE MEDIUM AND COMPUTER DATA SIGNAL

CROSS-REFERENCE TO RELATED APPLICATIONS

This application is based on and claims priority under 35 U.S.C. §119 from Japanese Patent Application No. 2006-289018 filed Oct. 24, 2006.

BACKGROUND

Technical Field

The invention relates to an image processing apparatus, a computer readable medium storing a program for controlling the image processing apparatus and a computer data signal.

SUMMARY

According to an aspect of the invention, an image processing apparatus includes an image acquisition section, a combination detection section and an angle detection section. The image acquisition section acquires a code pattern image from a surface of a recording medium on which the code pattern is formed. In the code pattern, N unit images are selectively placed in M reference positions that are arranged at predetermined intervals in two directions orthogonal to each other where $M \geq 4$ and $2 \leq N < M$. The combination detection section detects pairs of the unit images based on the predetermined intervals and respective positions of the unit images contained in the code pattern image acquired by the image acquisition section. The angle detection section detects a rotation angle of the code pattern image with respect to a predetermined reference axis based on an inclination of a line, with respect to the predetermined reference axis, connecting the unit images of each pair detected by the combination detection section.

BRIEF DESCRIPTION OF THE DRAWINGS

Exemplary embodiments of the invention will be described in detail below with reference to the accompanying drawings, wherein:

FIG. 4 is a drawing to show an example of a code block for embedding an identification code (identification code block);

FIG. 17 is drawing to show an example of a virtual lattice that is generated based on the rotation angle of a code pattern image detected in the exemplary embodiment of the invention and a specific example of a synchronization process using the virtual lattice;

DETAILED DESCRIPTION

Exemplary embodiments of the invention will be described in detail with reference to the accompanying drawings. First, the structure of a code pattern image according to the exemplary embodiment will be described. Then, a code pattern image generation apparatus that uses the code pattern image will be described, and furthermore an image processing apparatus will be described.

In the exemplary embodiment, predetermined information is acquired from a code pattern image printed on the full face of a recording medium such as a sheet of paper, for example. The code pattern image is an image of a code provided by encoding the predetermined information and may contain either or both of identification information and position information, for example. The identification information is information that uniquely identifies a recording medium or a document printed on the recording medium. The position information is information representing the coordinates on the recording medium. For example, a code block that is a component unit of the information contained in the code pattern image may be formed of unit code patterns. For example, the unit code pattern is the minimum unit for embedding information and may be representing by forming a unit image in a predetermined position. Here, an image of any shape may be used as the unit image. In the exemplary embodiment, a dot image (simply referred to as a "dot") is used as an example of the unit image. However, an image having any other shape such as a slanting line pattern may be used as the unit image.

Figure 1:
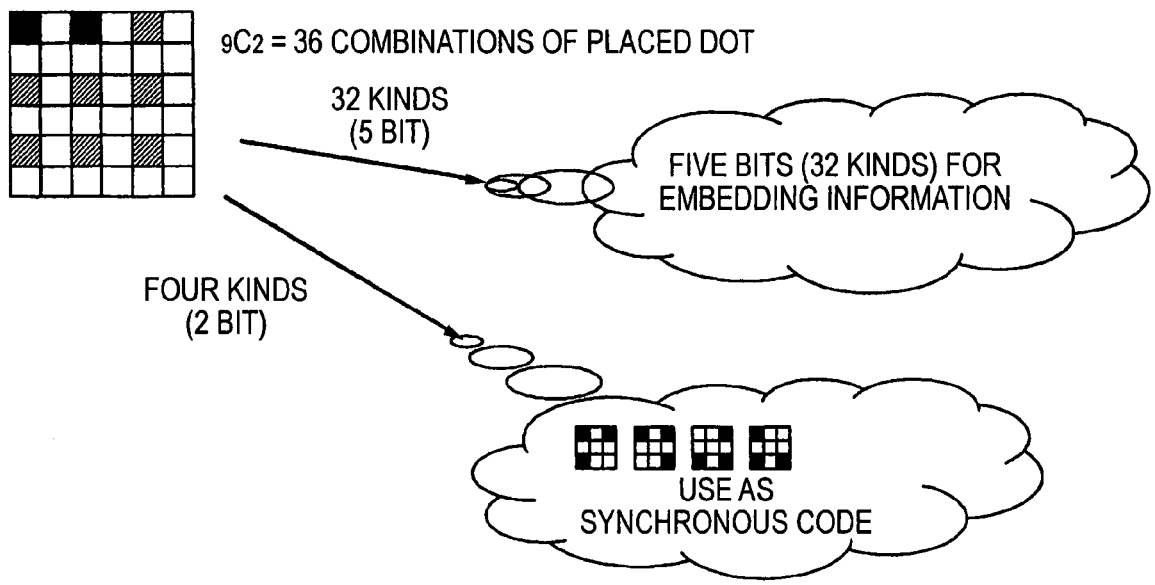
FIG. 1 is a schematic representation of an example of a unit code pattern of a code pattern image ($_9C_2$)

FIG. 1 is a schematic representation to show an example of the unit code pattern of the code pattern image. In this example, two positions are selected from among nine dot placeable positions having three position in height by three positions in width (hereinafter, expressed as "3×3 points"), and then, dots are placed in the selected two positions. In this case, 36 combinations of placed dots that the unit code pattern can take are available ($_9C_2 = 36$) (where $_mC_n = m!/\{(m-n)! \times$ n!}). When 600-dpi recording is executed, one dot size (size of quadrangle) shown in FIG. 1 is two pixels in height by two pixels in width (hereinafter, expressed as "2×2 pixels") (the one dot has a rectangle shape of 84.6 μm in a one-side length on calculation, but actually recorded toner image has a circular shape of about φ100 μm). Therefore, the unit code pattern is a rectangle having 0.5076 mm in a one-side length (0.5076 mm×0.5076 mm).

Four of the 36 combinations are used as a synchronous code for detecting a code block (described later) and for detecting a rotation angle of the code block. At this time, to detect the rotation angle of the code block in 90-degree units, the four patterns are selected so that they become patterns symmetrical with respect to 90-degree rotation. That is, if any one of the four combinations (patterns) is embedded as a synchronous code during generation of an image, the rotation angle of the code block (indicating in which direction of 0, 90, 180, and 270 the code block synchronized on a two-dimensional array directs) can be determined and corrected depending on which angle the detected synchronous code directs, during the detection.

The remaining 32 ($=2^5$) of the 36 combinations may be used to embed five-bit information per unit code pattern.

Figure 2:
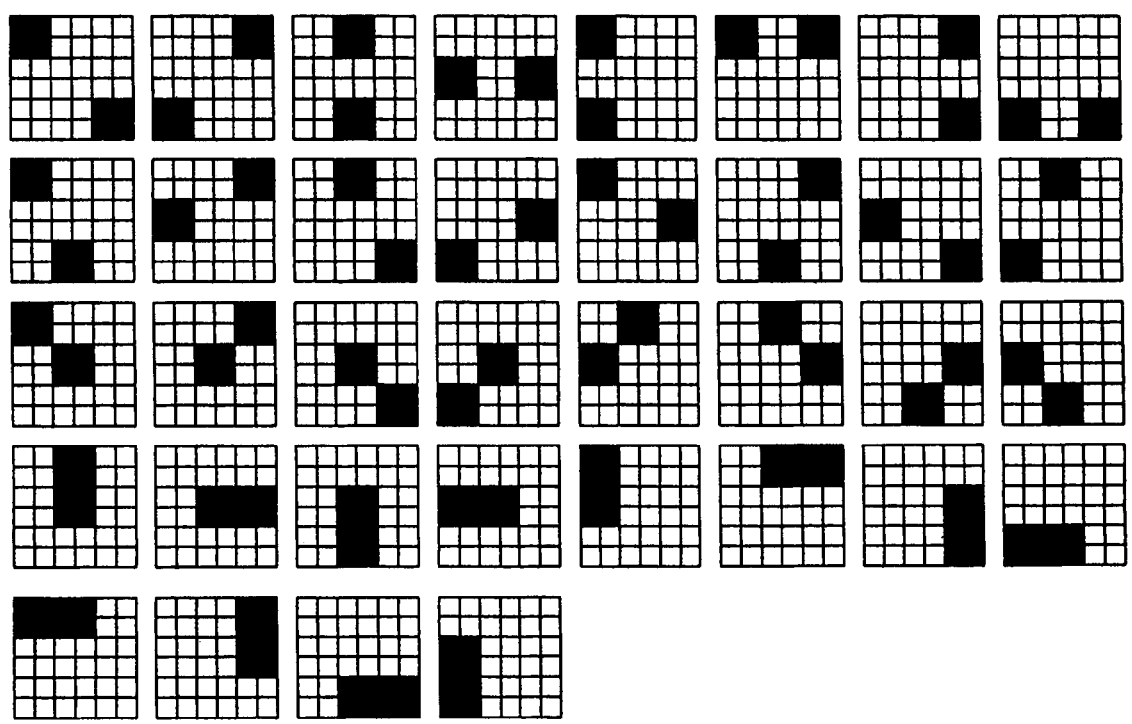
FIG. 2 is a drawing to show the 36 combinations of placed dots that $_9C_2$ unit code pattern can take.
Figure 3A:
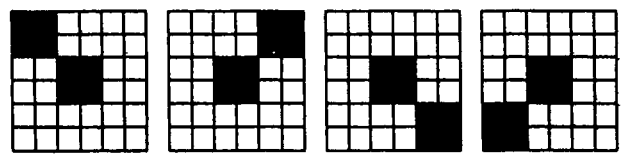
FIG. 3 is a drawing to show combinations of synchronous codes that can be selected from the 36 combinations of placed dots that $_9C_2$ unit code pattern can take.
Figure 3B:
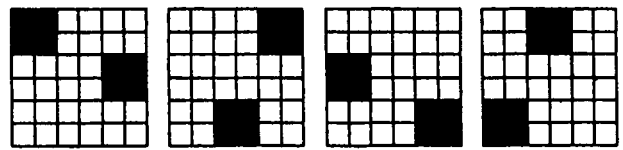
Figure 3C:
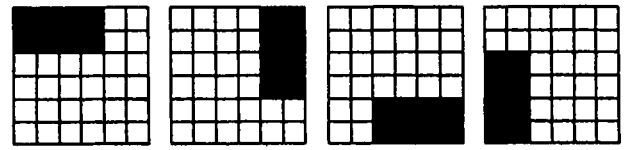
Figure 3D:
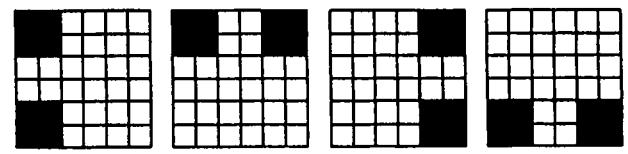
Figure 3E:
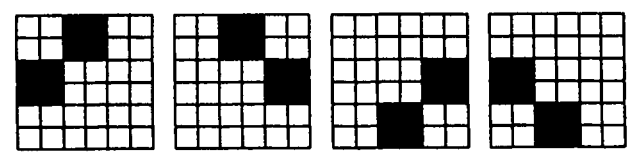
Figure 3F:
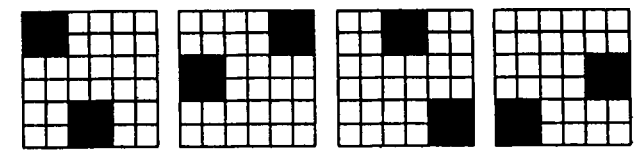
Figure 3G:
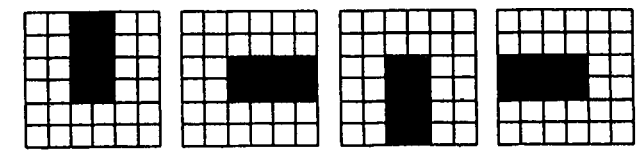
Figure 3H:
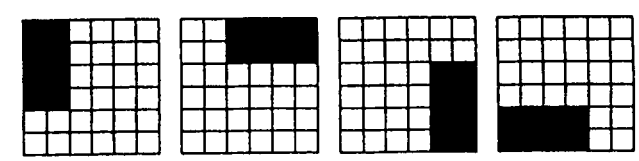

FIG. 2 shows the 36 dot placements that the unit code pattern shown in FIG. 1 can take. For simplicity of display, intervals between dots are omitted.

The unit code pattern is not limited to the method of placing dots in two positions among the nine positions as shown in FIGS. 1 and 2. Three or four positions may be selected, that is, a value smaller than nine may be adopted. For example, to place dots in three positions among the nine positions, 84 combinations of placed dots are available ($_9C_3$=84). The number of dot placeable positions is not limited to nine (three×three), but may be any other number, such as four (two×two) or 16 (four×four), for example.

(Groups of Synchronous Codes)

FIG. 3 shows groups of synchronous codes that can be selected from the 36 combinations of placed dots that the unit code pattern shown in FIG. 1 can take. In each group shown in FIG. 3, the synchronous codes are symmetrical with respect to 90-degree rotation. Any group may be used as four kinds of code patterns used for synchronous code.

(Code Block for Embedding Identification Code)

FIG. 4 shows an example of a code block for embedding an identification code (identification code block) as an example of identification information generated by an identification code generation section 13 (described later). The unit code patterns shown in FIG. 1 are arranged as 5×5 to form a code block.

The synchronous code shown in FIG. 3 is placed in the upper left corner of the code block. That is, any is selected from among the groups of synchronous codes in FIGS. 3A to 3H and one selected from among the four kinds of unit code patterns contained in the selected group of synchronous codes is placed in the upper left corner of the code block.

(Position Code)

Position codes will be described as an example of position information generated by a position code generation section 10 (described later). Four unit code patters to the right of the synchronous code are used to place an X position code that is encoded information unique to a position in the X direction. Four unit code patters below the synchronous code are used to place a Y position code that is encoded information unique to a position in the Y direction. Each of the X position code and the Y position code uses four unit code patters and thus can store 20-bit information (five bits×four). The X position code and the Y position code according to the exemplary embodiment are an example of the position information.

The 32 ($=2^5$) kinds of patterns for embedding information may not be not used as the position codes, and only 16 kinds of patterns may be used. In this case, the information amount per unit code pattern is four bits ($16=2^4$). Therefore, the position code has 16 bit (four bits×four) in information amount.

An M sequence may be used as an example of position codes. For example, if a 12-order M sequence is used, the sequence length of the M sequence is 4094($=2^{12}-1$). If 16 kinds of patterns are selected as the unit code patterns for a position code, four-bit information can be stored in each unit code pattern. Thus, 16-bit information (four bits×four) can be stored in one code block. Therefore, the M sequence having 4095 in sequence length can be divided into 255 ($=4095÷16$) code blocks, and the 255 code blocks may be stored. Since the width of one code block is 2.538 mm ($=0.5076$ mm/unit code pattern width×5), the length of the 255 consecutive code blocks is 647.19 mm and the length of 647.19 mm can be encoded. That is, encoding can be executed up to A2-size (420 mm×594 mm) paper.

Although one M sequence is used to encode positions by way of example, plural M sequences can be concatenated to furthermore increase the number of the positions that can be encoded. For example, in the case of using 11-order M sequence, four 11-order M sequences may be concatenated for encoding A0-size paper.

(Identification Code)

An identification code is placed in the remaining area of the code block. Since 16 unit code patterns (four×four) can be placed in the remaining area, 80-bit information (five bits/unit code pattern×16) can be stored in the remaining area. Since the unit code pattern of the exemplary embodiment is a multilevel code, an error occurring during reading also occurs in units of the unit code patterns. Therefore, an error correction code method may be a method that can make an error correction in block units. If RS code that is a known block error correction code method is used for the identification code, the block length of the RS code may be set to five bits, which is the information amount of the unit code pattern. In this case, the code length of the RS code becomes 16 blocks ($=80$ bits÷5 bits/block). For example, if a three-block correction capability is provided, the information code length becomes 10 blocks ($=16$ blocks−three blocks×2). In this case, 50-bit information ($=$five bits/block×10 blocks) can be embedded in the identification code area.

(Code Pattern Image Generation Apparatus)

Figure 5:
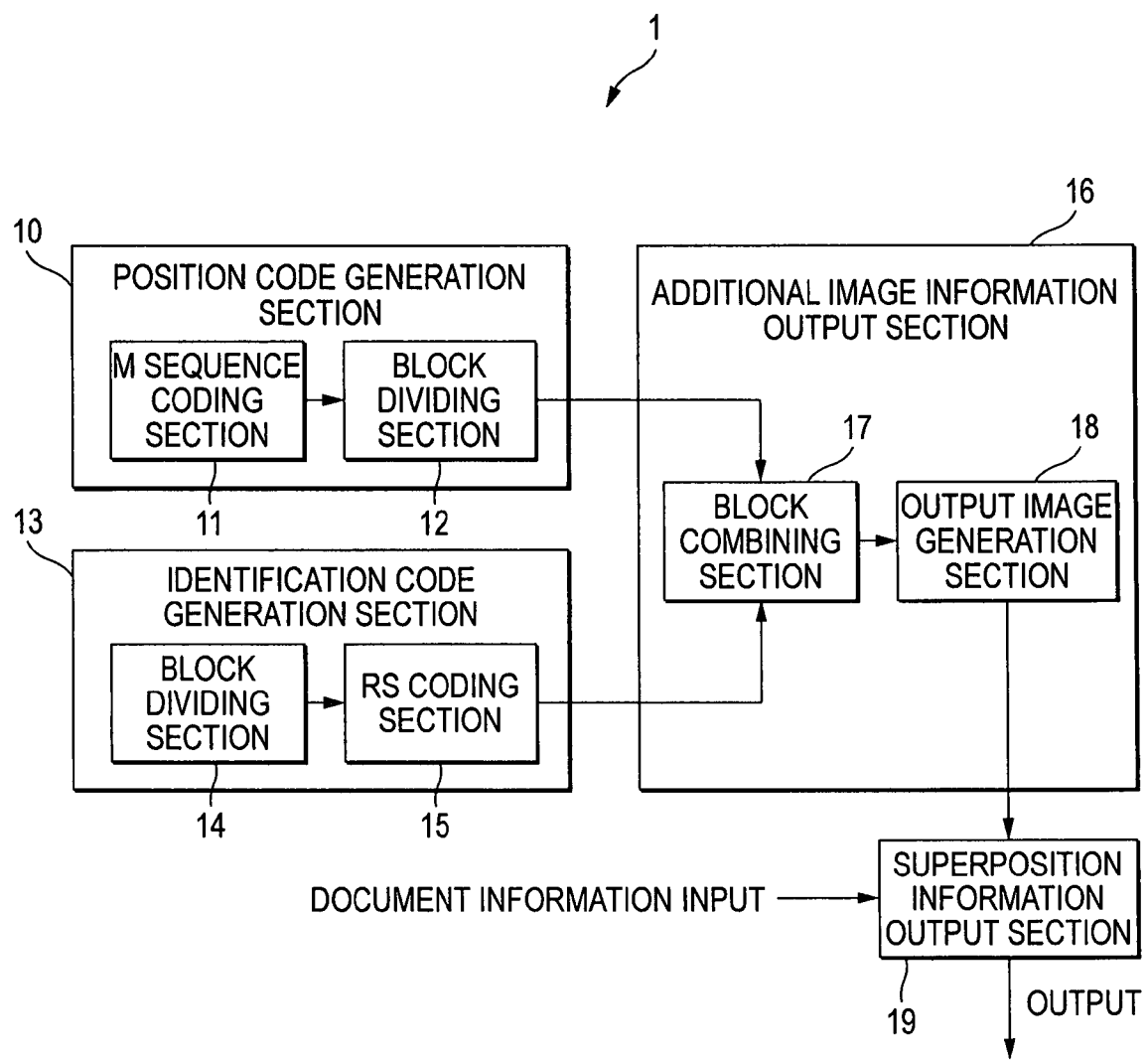
FIG. 5 is a functional block diagram to show an example of a code pattern image generation apparatus.

A code pattern image generation apparatus for generating the code pattern image will be described below. FIG. 5 is a functional block diagram to describe an example of a code pattern image generation apparatus 1.

The code pattern image generation apparatus 1 according to the exemplary embodiment of the invention includes the position code generation section 10 for generating position codes unique to recording positions on a recording medium such as a sheet of paper or unique to recording positions of a document image recorded on the recording medium. The code pattern image generation apparatus 1 also includes the identification code generation section 13 for generating an identification code that identifies the recording medium or the document information recorded on the recording medium. The code pattern image generation apparatus 1 further includes an additional image information output section 16 that converts the position information and the identification information into image information and outputs the image information as additional image information, and a superposition information output section 19 for converting input document information into image information, superposing the additional image information and the image information, and outputs the resultant superposition information.

The position code generation section 10 includes an M sequence coding section 11 for converting the position information into an M sequence and encodes the M sequence, and a block dividing section 12 for dividing the coded M sequence into code blocks having a predetermined size. The M sequence coding section 11 codes the position information using the M sequence. The required M sequence order is found from a length to be encoded and is dynamically generated, to thereby encode the position information. If the length to be encoded is predetermined, an M sequence may be previously stored in a memory of the image generation apparatus 1. In this case, when an image is generated, the M sequence is read from the memory.

The block dividing section 12 divides the encoded M sequence into code blocks according to an amount of information that can be stored in one code block and stores the divided sequences. For example, in the case of using a 12-order M sequence, the sequence length of the M sequence becomes 4095 ($=2^{12}-1$) as previously described with reference to FIG. 4. When 16 kinds of patterns are selected as the unit code patterns for a position code and four-bit information is stored in each of the unit code patterns, one code block contains four unit code patterns of the position code. Thus, 16-bit information (four×four) can be stored therein. Therefore, the block dividing section 12 divides the M sequence of the sequence length 4095 into 255 code blocks ($=4095 \div 16$).

The identification code generation section 13 includes a block dividing section 14 for dividing identification information into plural blocks and an RS coding section 15 for performing the RS coding process for the provided blocks and adding a redundant block for error correction. The block dividing section 14 divides the identification information into plural five-bit blocks. For example, in the case of embedding 50-bit information, 50 bits are divided into 10 five-bit blocks as previously described with reference to FIG. 4. The RS coding section 15 performs the RS coding process for the provided blocks and adds a redundant block for error correction. If the RS code can correct an error in three blocks, the code length becomes 16 blocks.

The additional image information output section 16 includes a block combining section 17 for generating a (virtual) two-dimensional plane using the identification code and the position code and an output image generation section 18 for generating a code pattern image. The block combining section 17 places the identification code and the position code on a two-dimensional plane to generate the two-dimensional code plane. The output image generation section 18 refers to the code plane, selects a code pattern corresponding to each code value, and generates a code pattern image as additional image information. Specifically, for the purpose of simplifying the internal process, until the generation of the code plane, the identification code and the position code are treated by means of code values that are internal codes. The output image generation section 18 replaces each code value with a code pattern (image information) corresponding to each code value to generate the code pattern image.

The superposition information output section 19 converts externally input document information into image information, superposes the code pattern image and the image information, and outputs the resultant superposition information. The superposition information is information described in a print description language (PDL).

(Placement of Position Codes)

Figure 6:
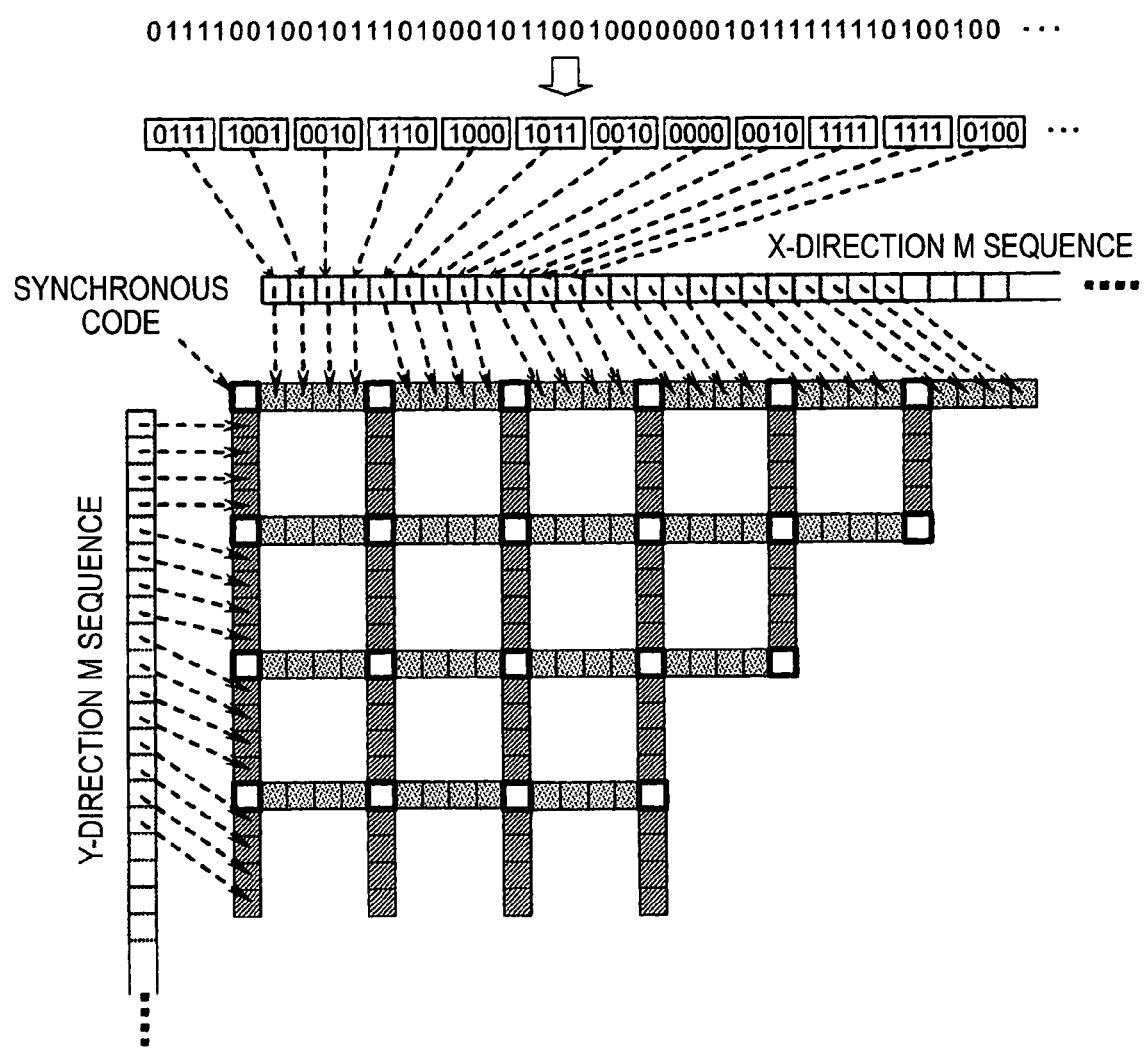
FIG. 6 is a drawing to show an example wherein position codes are placed in a code pattern image.

FIG. 6 shows an example in which position codes are placed in the code pattern image. The M sequence is divided into four-bit blocks (the number of unit code pattern bits of position code is four bits) as described above and each division block may be placed in an area between synchronous codes in order. FIG. 6 describes only X position code; a similar process also applies to Y position code.

Since each code block contains a synchronous code, position code cannot be placed consecutively. For example, a synchronous code is placed every four unit code patterns of position code.

(Placement of Identification Codes)

Figure 7:
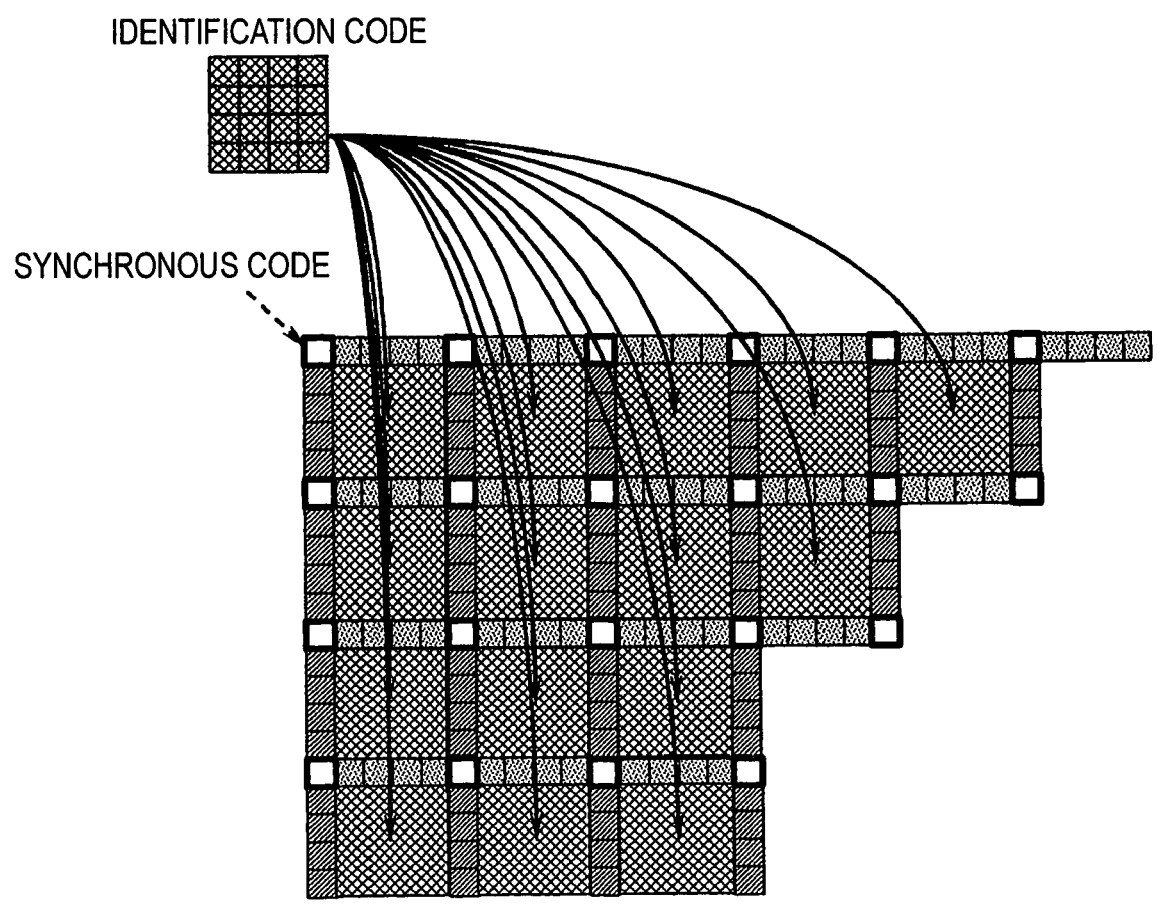
FIG. 7 is a drawing to show an example wherein identification codes are placed in a code pattern image.

FIG. 7 shows an example wherein identification codes are placed in a code pattern image. For example, each identification code is placed in the quadrant below the right of a synchronous code. For example, in the identification codes, the same information is always placed independently of the image position.

(Detailed Description of Image Processing Apparatus)

Figure 8:
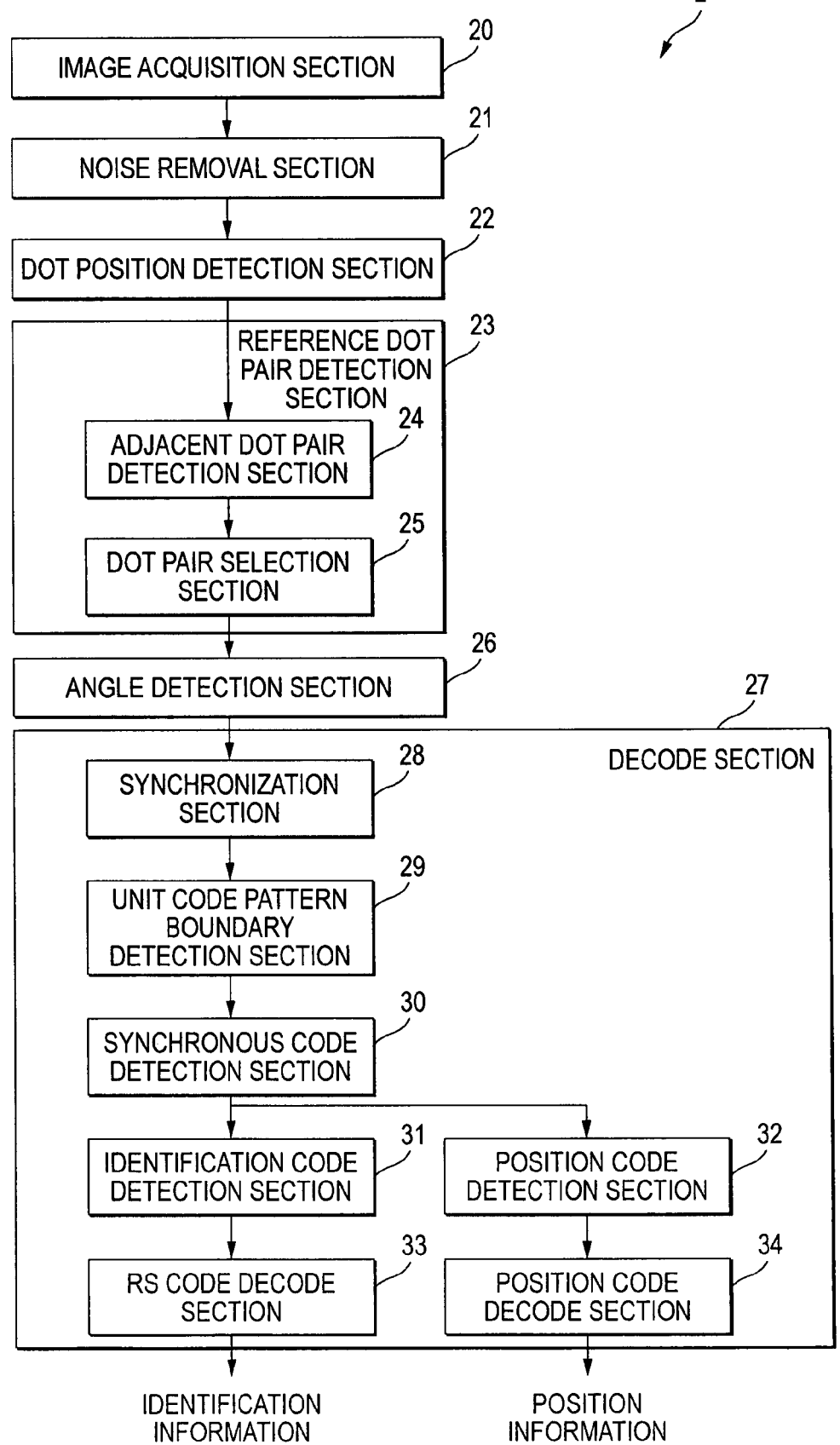
FIG. 8 is a block diagram to show an example of the configuration of an image processing apparatus according to an exemplary embodiment of the invention.

FIG. 8 is a block diagram to show an example of the configuration of an image processing apparatus 2 according to the exemplary embodiment of the invention. As shown FIG. 8, the image processing apparatus 2 according to the exemplary embodiment of the invention includes an image acquisition section 20, a noise removal section 21, a dot position detection section 22, a reference dot pair detection section 23, an angle detection section 26, and a decode section 27, for example. The reference dot pair detection section 23 includes an adjacent dot pair detection section 24 and a dot pair selection section 25, for example. The decode section 27 includes a synchronization section 28, a unit code pattern boundary detection section 29, a synchronous code detection section 30, an identification code detection section 31, a position code detection section 32, an RS code decode section 33, and a position code decode section 34, for example.

The image acquisition section 20 acquires a code pattern image read by an imaging device such as a CCD (Charge Coupled Device) or a CMOS (Complementary Metal Oxide Semiconductor) In the exemplary embodiment, the image acquisition section 20 is provided as an example of an image acquisition section.

The noise removal section 21 performs a process of removing noise contained in the acquired code pattern image (noise occurring due to variations in sensitivity of the imaging device or in an electronic circuit), for example. Although the type of noise removal process should be matched with the characteristic of the imaging system, the blurring process and the sharpening process of unsharp masking may be applied, for example.

The dot position detection section 22 detects a dot image from the code pattern image and detects a center position of each dot (dot position), for example. In this case, at first the dot position detection section separates dot images and a background image portion by performing a binarization process, and detects the dot position from each binarized dot image. However, the binarized dot image may contain a large number of noise components, and therefore it may be necessary for the dot position detection section 22 to perform a filtering process so as to determine as to whether or not the image is a dot image based on the area and the shape of the binarized dot image as well.

The adjacent dot pair detection section 24 included in the reference dot pair detection section 23 refers to the dot positions detected by the dot position detection section 22 and pairs each dot position and another dot position closest thereto (creates a pair of adjacent dots), for example.

The dot pair selection section 25 included in the reference dot pair detection section 23 selects a pair of reference dots from among the generated pairs of adjacent dots, for example. The pair of reference dots refers to a "pair of dots a distance between which is particularly short among the pairs of adjacent dots."

In the exemplary embodiment, the reference dot pair detection section 23 is provided as an example of a combination detection section.

The angle detection section 26 detects a rotation angle of the code pattern image based on the selected pair of reference dots, for example. In the exemplary embodiment, the angle detection section 26 is provided as an example of an angle detection section.

The decode section 27 outputs predetermined information (the identification information and the position information) contained in the code pattern image based on information of the received dot positions, the rotation angle of the code pattern image, etc., for example. In the exemplary embodiment, the decode section 27 is provided as an example of an information acquisition section.

The synchronization section 28 included in the decode section 27 refers to the detected dot positions, the rotation angle of the code pattern image, and a distance between the reference dots of each pair, for example, and synchronizes the dot positions on a two-dimensional array. The term "synchronize" is used to mean a process of replacing information indicating whether a detected dot is present or absent as an image by digital data on the two-dimensional array in such a manner that a position where a dot exists on the two-dimensional array is replaced with "1" and a position where no dot exists is replaced with "0." In the exemplary embodiment, the synchronization section 28 is provided as an example of a two-dimensional array generation section.

The unit code pattern boundary detection section 29 included in the decode section 27 detects a boundary between the unit code patterns forming each code block based on the dot positions synchronized on the two-dimensional array, for example. In particular, for example, a position of a rectangular separator including blocks each having the same size as the unit code pattern is moved appropriately on the two-dimensional array output by the synchronization section 28 and the position where the number of dots contained in the blocks of the separator becomes uniform is detected as a position of the boundary between the unit code patterns. The information embedding system may also be determined in such a manner that if the uniform number of dots is two, the code pattern is a code pattern in which information is embedded using the unit code patterns as $_9C_2$ and that if the uniform number of dots is three, the code pattern is a code pattern in which information is embedded using the unit code patterns as $_9C_3$. In the exemplary embodiment, the unit code pattern boundary detection section 29 is provided as an example of a block detection section.

The synchronous code detection section 30 included in the decode section 27 refers to the kind of the unit code pattern detected from the two-dimensional array and detects a synchronous code, for example. The synchronous code detection section may detect the orientation of the code pattern (90-degree units) according to which of the four kinds of synchronous codes (see FIG. 3) is detected, and may correct the detected orientation.

Further, the identification code detection section 31 and the position code detection section 32 included in the decode section 27 acquire an identification code and a position code, respectively, with using the position of the synchronous code as a reference, from the code pattern whose angle is corrected, for example.

Further, the RS code decode section 33 included in the decode section 27 decodes the detected identification code using the same parameters as those used in the coding process of RS code (the number of blocks, etc.), and outputs the identification information, for example.

The position code decode section 34 included in the decode section 27 extracts a partial sequence of M sequence from the position code acquired by the position code detection section 32, refers to the position of the detected partial sequence relative to the M sequence used in generating the image, and outputs a value provided by making offset correction to the position based on the synchronous code (because synchronous code is placed between position codes) from the position of the partial series as position information, for example.

The functions are implemented as the software and hardware resources cooperate. Specifically, a CPU (not shown) of the image processing apparatus 2 reads a program for implementing the functions of the sections making up the image processing apparatus 2, for example, into main memory from a magnetic disk unit for execution. The program and data stored in the magnetic disk unit may be loaded from a recording medium such as a CD or may be downloaded through a network of the Internet, etc.

(Detection of Pairs of Adjacent Dots)

FIG. 9 is a drawing to show an example of the result of detecting pairs of adjacent dots by the adjacent dot pair detection section 24 (see FIG. 8) during the processes executed by the reference dot pair detection section 23 (see FIG. 8).

Figure 9A:
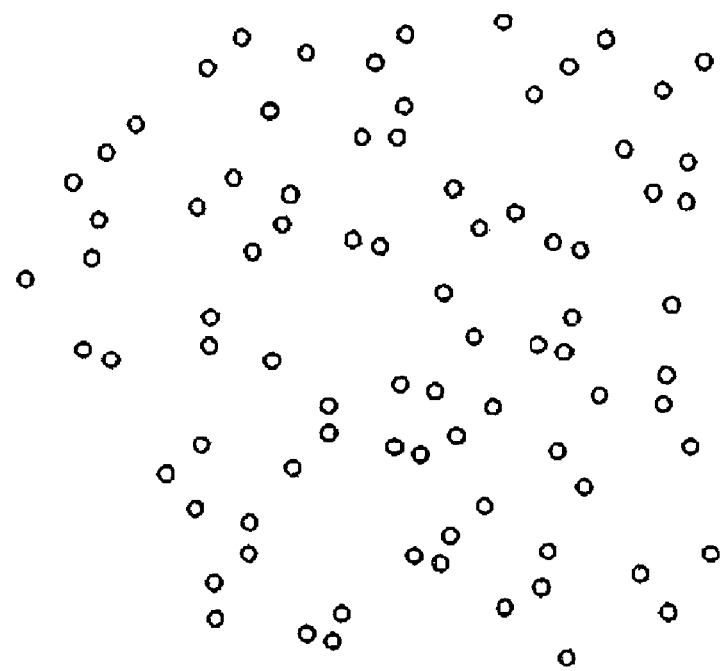
FIG. 9 is a drawing to show an example of the result of detecting pairs of adjacent dots.

FIG. 9A shows examples of dot positions detected by the dot position detection section 22 (see FIG. 8). The adjacent dot pair detection section 24 refers to the dot positions as shown in FIG. 9A, and pairs each dot position and another dot position closest thereto (creates a pair of adjacent dots).

Figure 9B:
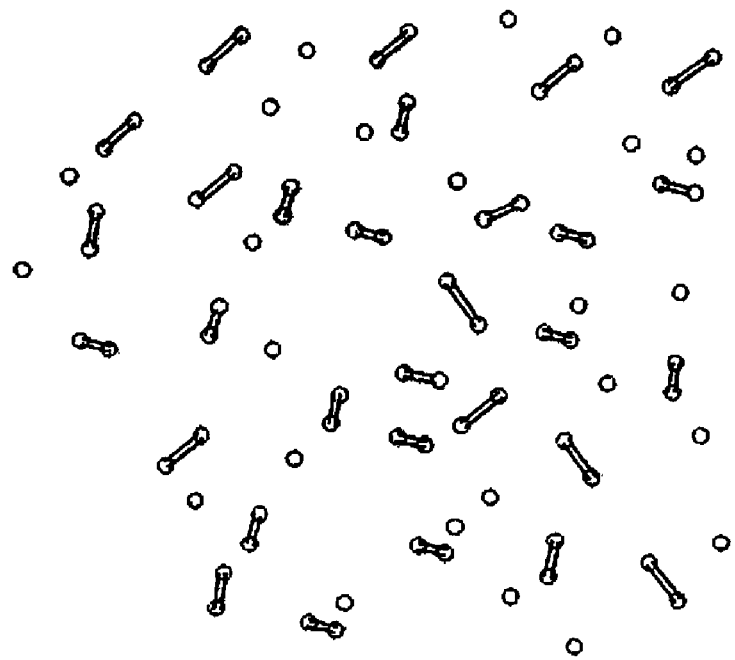

FIG. 9B shows examples of the pairs of adjacent dots detected by the adjacent dot pair detection section 24, from the dot positions shown in FIG. 9A. Here, each pair of adjacent dots is represented so that the dots are connected by a line. In this case, if a dot B closest to another dot A is already paired with still other dot C as a pair of adjacent dots, the dot A is not paired with any other dot as a pair of adjacent dots.

(Selection of Pair of Reference Dots)

FIG. 10 is a drawing to show an example of the process in which the dot pair selection section 25 (see FIG. 8) selects a pair of reference dots during the processes executed by the reference dot pair detection section 23 (see FIG. 8).

First, the dot pair selection section 25 creates a histogram based on a distance between adjacent dots of each pair detected by the adjacent dot pair detection section 24 (see FIG. 8), for example. (See FIG. 10A). Next, the dot pair selection section 25 integrates frequencies in the histogram in ascending order of the distance between the adjacent dots. (See FIG. 10B). The dot pair selection section 25 adopts a distance between adjacent dots where the integrated frequency becomes a predetermined value, as a threshold value for the distance between reference dots. (See FIG. 10C). The threshold value thus determined is used to exclude pairs of dots having a large distance therebetween. Thereby, the dot pair selection section 25 obtains pairs of reference dots.

The "predetermined value" is a value provided by multiplying the number of all detected dots by a value determined on design by a kind of a unit code pattern, for example. For example, for the $_9C_2$ unit code patterns (see FIG. 1), two dots are placed adjacently up and down or from side to side in 12 patterns among 36 patterns. Thus, the probability that two dots are placed adjacently up and down or from side to side is ⅓. Therefore, in pairs of dots, whose number is equal to a value obtained by multiplying a half of the number of detected dots (because those dots form pairs) by ⅓, two dots would be placed adjacently up and down or from side to side in terms of design. In fact, the unit code patterns are placed adjacently, and thus the probability becomes a larger value. As the "predetermined value," the value obtained by multiplying a half of the number of detected dots by the probability that two dots may be placed adjacently up and down or from side to side in unit code patterns may be used. For example, for the $_9C_2$ unit code patterns (see FIG. 1), the threshold value corresponds to a distance between dots when two are selectively placed at adjacent reference positions in the up and down direction or from side to side. Therefore, in such a case, the obtained pairs of reference dots involve the positional relationship as they cross each other.

(Detection of Rotation Angle of Code Pattern Image)

FIG. 11 shows an example of the result of selecting the pairs of reference dots by the dot pair selection section 25 (see FIG. 8). FIG. 11 shows an example in which when the rotation angle of the code pattern image is detected, the pairs of reference dots are placed in a coordinate system consisting of a reference axis X and a reference axis Y described later.

Figure 11A:
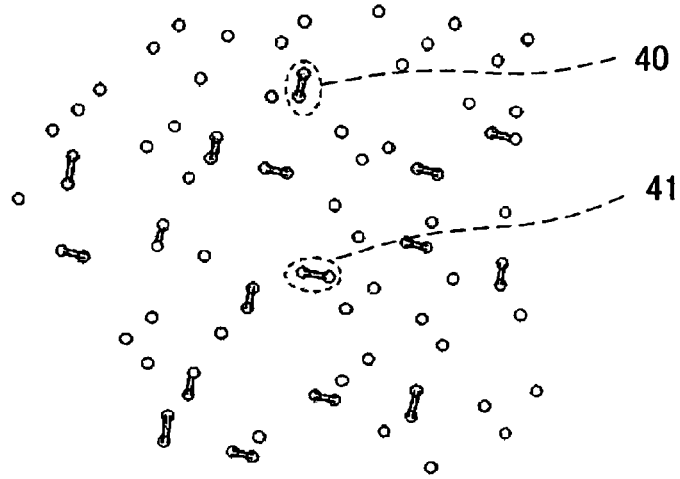
FIG. 11 is a drawing to show an example of the result of selecting the pairs of reference dots, and examples wherein reference dots are placed in a coordinate system made up of a reference axis X and a reference axis Y.

FIG. 11A shows an example of the result of selecting the pairs of reference dots by the dot pair selection section 25 (see FIG. 8), from among the pairs of adjacent dots (see FIG. 9B). Here, each pair of reference dots is represented so that the reference dots are connected by a line.

In the example shown in FIG. 11A, the pairs of reference dots are classified into (i) a group of the pairs of reference dots that direct in the direction of a pair of reference dots 40 and (ii) a group of the pairs of reference dots that direct in the direction of a pair of reference dots 41. That is, the pairs of reference dots can be classified into two groups in two directions. The direction of the group to which the pair of reference dots 40 belongs and the direction of the group to which the pair of reference dots 41 belongs form almost a predetermined angle (90 degrees).

Next, FIGS. 11B and 11C will be described.

Figure 11B:
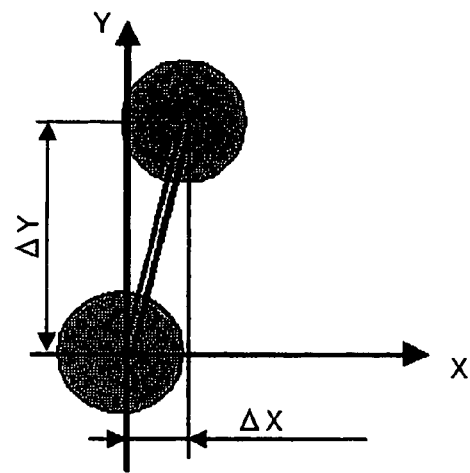
Figure 11C:
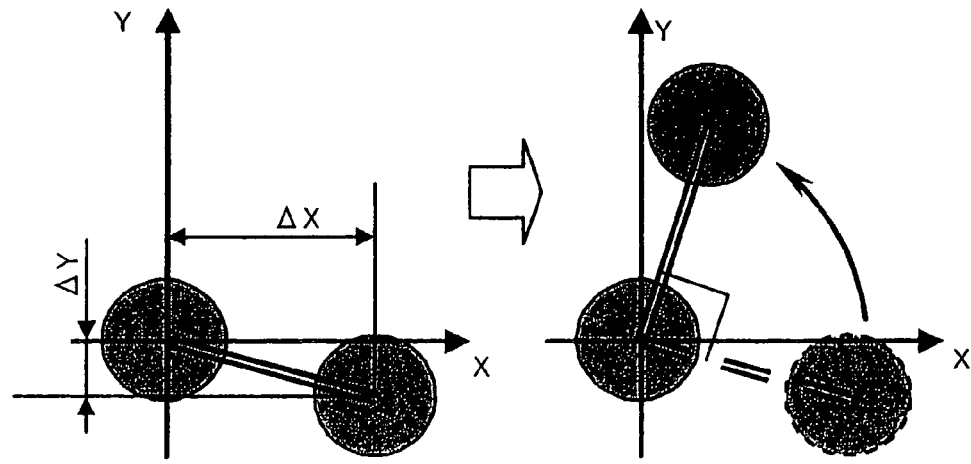

FIG. 11B shows the case where one dot of a pair of reference dots is at the origin of the reference coordinate system consisting of the reference axis X and the reference axis Y, and the other dot is in a first quadrant. FIG. 11C shows the case where the other dot of the pair of reference dots is in a fourth quadrant. Thus, the pair of reference dots is positioned so that the one dot of the pair of reference dots is always located at the origin of the reference coordinate system and an inclination angle of the pair of reference dots (angle of a line connecting one dot and the other dot of the pair of reference dots with respect to the reference axis X) is limited to the range of −90 degrees to 90 degrees.

The reference axis X and the reference axis Y making up the reference coordinate system will be described. For example, the horizontal direction that the CMOS for capturing the code pattern image has may be set to the reference axis X and the corresponding vertical axis may be set to the reference axis Y. However, this is an example, and the reference axes may be set by any other method.

According to the reference axes thus determined, a distance ($\Delta X$) in the reference axis X direction and a distance ($\Delta Y$) in the reference axis Y direction between the dots of the pair of reference dots are determined. In FIG. 11B, both $\Delta X$ and $\Delta Y$ are positive values, while in FIG. 11C, $\Delta X$ is a positive value and $\Delta Y$ is a negative value. If a generally known operational expression of a trigonometric function is applied to $\Delta X$ and $\Delta Y$ for computation, the inclination angle of the pair of reference dots with respect to the reference axis X can be found.

If the found inclination angle is less than 0 degrees, 90 degrees are added to thereto (see the right drawing in FIG. 1C). By performing such calculation, the inclination angles are compressed in the range of 0 degree to 90 degrees.

Based on the thus obtained plural inclination angles, θmesh is found as the rotation angle of the code pattern image. Here, θmesh renders σ defined by the following expression be minimum, $$\sigma = \sum_{i}^{n}(\theta deg_i - \theta mesh)^2$$

where $\theta deg_i$ denotes the obtained inclination angles and n denotes number of the pairs of reference dots.

Also, an average value of the inclination angles is calculated, to thereby obtain an average rotation angle of the code pattern image. When this calculation is performed, the angle of the pairs of reference dots in two directions can be calculated as the inclination angle in one direction.

For example, in the case of using a pen reader, an image may be distorted depending on the attitude of the pen reader and the pairs of reference dots on the detected code pattern image may not direct in a 90-degree orthogonal directions. In such a case, an average value is used separately in two directions, to thereby be able to detect the rotation angle of the code pattern image even from the distorted image.

(Specific Example of Detection of Pair of Adjacent Dots)

Figure 12A:
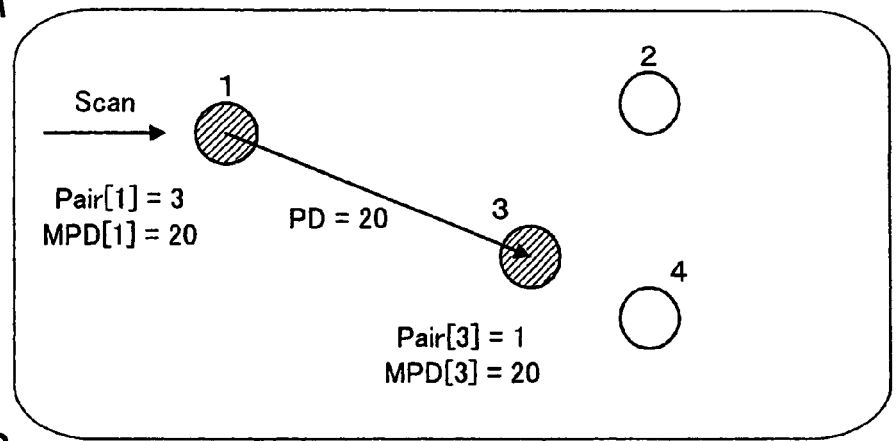
FIG. 12 is a drawing to show a specific example of detecting a pair of adjacent dots.
Figure 12B:
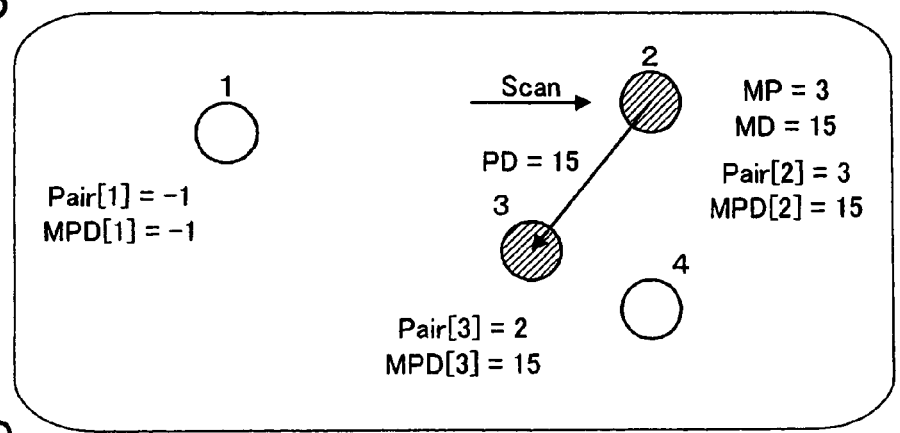
Figure 12C:
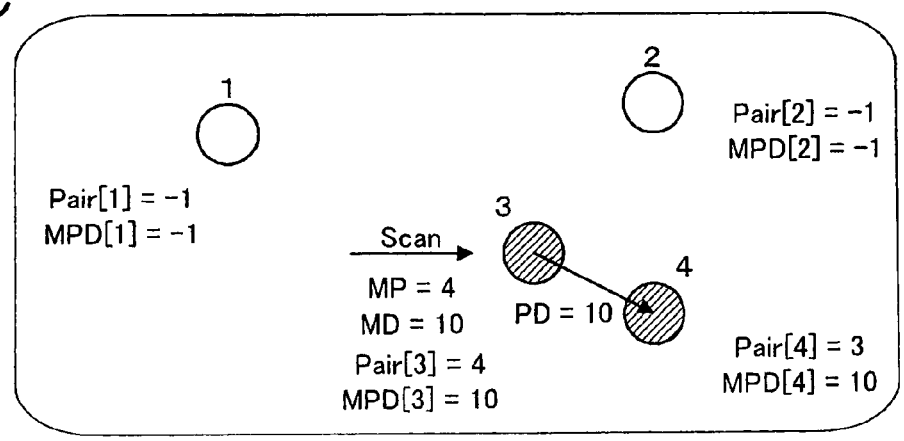

FIG. 12 is a drawing to show a specific example of detecting a pair of adjacent dots by the adjacent dot pair detection section 24 (see FIG. 8). With reference to FIG. 12, the specific example of detecting a pair of adjacent dots from among dots having numbers "1" to "4" based on the positions of the dots will be described. It should be noted that five or more dots may be formed on a recording medium.

First, the adjacent dot pair detection section 24 recognizes the positions of the dots with numbers "1" to "4" detected by the dot position detection section 22 (see FIG. 8). The adjacent dot pair detection section 24 scans a distance from the dot having the number "1" (as a reference) to each dot having another number. As a result, the adjacent dot pair detection section 24 recognizes that the dot closest to the dot having the number "1" is the dot having the number "3" and the distance between the dots (may be referred to as a "pair distance" and be abbreviated as "PD") is 20. The adjacent dot pair detection section 24 generates information "Pair [1]=3" indicating that an adjacent dot of the dot having the number "1" is the dot having the number "3," and information "MPD [1]=20" indicating that a distance to the dot having the number "3" is 20. The adjacent dot pair detection section 24 generates the information "Pair [3]=1" and the information "MPD [3]=20" simultaneously.

The number in [ ] (parentheses) of "Pair [ ]" indicates the number of a home dot and a value defined by "Pair [ ]=" indicates the number of the associated dot, which is the counterpart of the pair of adjacent dots, at present. "MPD" is short for "Minimum Pair Distance," and the number in [ ] (parentheses) of "MPD [ ]" indicates the number of the home dot. A value of "MPD [ ]" indicates a distance to the associated dot, which is the counterpart of the pair of adjacent dots, at present.

Subsequently, the distance to each dot other than the dot having the number "1" is scanned based on the dot having the number "2" in a similar manner to that described above. When the dot having the number "1" is to be scanned, it has already been determined that the dot having the number "1" is not the dot closest to the dot having the number "2" and therefore, the dot having the number "1" is not scanned.

As a result, the adjacent dot pair detection section 24 recognizes that the dot closest to the dot having the number "2" is the dot having the number "3," and that a distance between both the dots (PD) is 15. This distance is shorter than the distance between the dots having the numbers "1" and "3" (that is, 20). Therefore, the adjacent dot pair detection section 24 generates information "Pair [2]=3" and information "MPD [2]=15," and information "Pair [3]=2" and information "MPD [3]=15." At this time, the dot having the number "1" is deprived of the dot having the number "3" by the dot having the number "2" and thus, the adjacent dot pair detection section 24 changes information to "Pair [1]=−1" and "MPD [1]=−1," and the dot having the number "1" enters a state in which the dot having the number "1" is not paired with any dot as a pair of adjacent dots.

Likewise, the distance to each dot other than the dots having the number "1" and "2" is scanned based on the dot having the number "3". As a result, the adjacent dot pair detection section 24 recognizes that the dot closest to the dot having the number "3" is the dot having the number "4," and the distance between the both dots (PD) is 10. This distance is shorter than the distance between the dots having the numbers "2." and "3" (that is, 15). Therefore, the adjacent dot pair detection section 24 generates information of "Pair [3]=4," information of "MPD [3]=10," and information of "Pair [4]=3" and information of "MPD [4]=10." At this time, the dot having the number "2" is deprived of the dot having the number "3" by the dot having the number "4" and thus, the adjacent dot pair detection section 24 changes information to "Pair [2]−1" and "MPD [2]=−1." The dot having the number "2" enters a state in which the dot having the number "2" is not paired with any dot as a pair of adjacent dots.

The not-scanned dot is only the dot having the number "4," but the dot having the number "4" has already been paired with the dot having the number "3" as a pair of adjacent dots and is not scanned. Then, the process is completed.

The case where only four dots exist has been described by way of example. However, if the number of dots is five or more, the above-described scan procedure is repeated. Thereby, pairs of adjacent dots are detected in order.
(Specific Example of Detection Process of Pair of Adjacent Dots)

Figure 13:
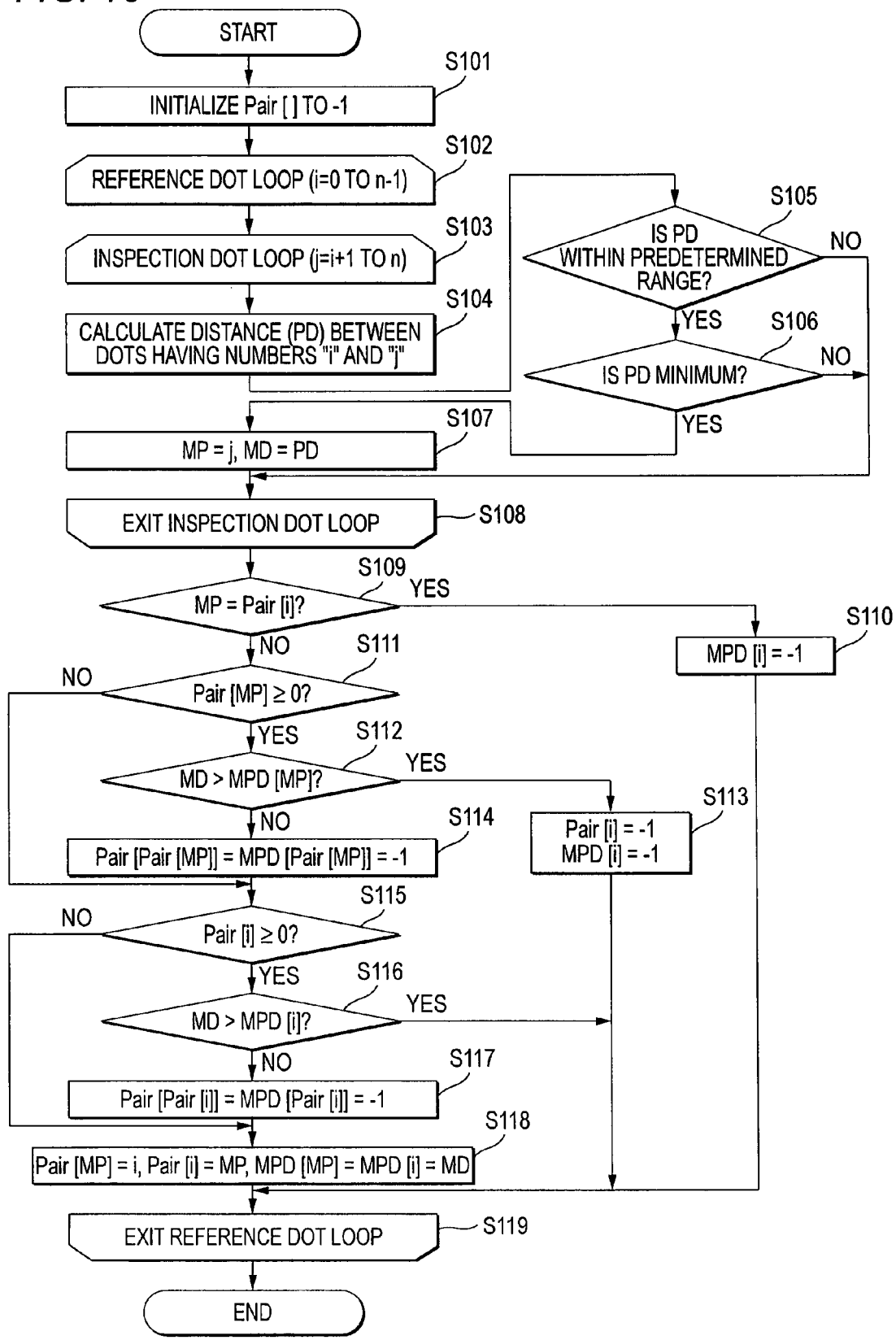
FIG. 13 is a flowchart to show a specific example of detecting a pair of adjacent dots.

Of the operation of the image processing apparatus 2 (see FIG. 8), FIG. 13 shows a flowchart corresponding to the specific example of detecting a pair of adjacent dots previously described briefly with reference to FIG. 12.

In the image processing apparatus 2, first the adjacent dot pair detection section 24 (see FIG. 8) initializes "Pair [ ]" to −1 for all dots (step 101). Next, the adjacent dot pair detection section 24 changes number "i" of a dot, which is currently in question, in order from 0 to n−1 ("n" denotes the number of all dots) and repeats steps 103 to 118 (steps 102 to 119: "Reference dot loop"). In this reference dot loop, for example, the adjacent dot pair detection section 24 performs the following process for the dot, which is currently in question).

The adjacent dot pair detection section 24 changes number "j" of a dot, which is to be paired with the dot currently in question (the number "i") in order from i+1 to n, and repeats steps 104 to 107 (steps 103 to 108: "Inspection dot loop"). In this inspection dot loop, for example, the adjacent dot pair detection section 24 performs the following process for a pair of dots, which are currently in question.

The adjacent dot pair detection section 24 calculates a distance (PD) between the dots currently in question (the numbers "i" and "j") (step 104). The adjacent dot pair detection section 24 determines as to whether or not the calculated PD is within a predetermined range (step 105). If the calculated PD is not within the predetermined range, the process goes to step 108. If the PD is within the predetermined range, the adjacent dot pair detection section 24 determines as to whether or not the currently handled PD is the minimum among the PDs calculated so far (step 106). If the adjacent dot pair detection section does not determine that that the PD is the minimum, the process goes to step 108. If the adjacent dot pair detection section does not determines that the PD is the minimum, the number of the dot that forms a temporary dot pair with the dot currently in question to and having the number "i" (MinPair (may be abbreviated as "MP")) is set to MP=j, and a distance between the both dots (MinDist (may be abbreviated as "MD")) is set to MD=PD (step 107).

Subsequently, after the inspection dot loop is completed, the adjacent dot pair detection section 24 determines as to whether or not MP=Pair [i] (step 109). Since the MP is initialized to −1 just before step 103 although not described above, MP=Pair [i] is MP=Pair [i]=−1. This means that there is no dot having the number "j" satisfying the condition in the inspection dot loop. Therefore, if MP=Pair [i], the adjacent dot pair detection section 24 sets MPD [i] to −1 (step 110). Then, the process goes to step 119.

If the adjacent dot pair detection section 24 does not determine that MP=Pair [i], the process goes to step 111. At step 111, the adjacent dot pair detection section 24 determines as to whether or not Pair [MP]≧0. If the adjacent dot pair detection section 24 does not determine that Pair [MP]≧0, namely, if Pair [MP]=−1, the process goes to step 115 (described later). If Pair [MP]>0, the adjacent dot pair detection section 24 determines as to whether or not MD>MPD [MP] (step 112). If MD>MPD [MP], the adjacent dot pair detection section 24 sets Pair [i]=−1 and MPD [i]=−1 (step 113). The process goes to step 119. If the adjacent dot pair detection section 24 does not determine that MD>MPD [MP], the adjacent dot pair detection section 24 sets Pair [Pair [MP]]=MPD [Pair [MP]]=−1 (step 114).

Subsequently, the adjacent dot pair detection section 24 determines as to whether or not Pair [i]≧0 (step 115). If the adjacent dot pair detection section 24 does not determine that Pair [i]≧0, namely, if Pair [i]=−1, the process goes to step 118 (described later). If Pair [i]≧0, the adjacent dot pair detection section 24 determines as to whether or not MD>MPD [i] (step 116). If MD>MPD [i], the process goes to step 119. If the adjacent dot pair detection section 24 does not determine that MD>MPD [i], the adjacent dot pair detection section 24 sets Pair [Pair [i]]=MPD [Pair [i]]=−1 (step 117). Subsequently, the adjacent dot pair detection section 24 sets Pair [MP]=i, Pair [i]=MP, and MPD [MP]=MPD [i]=MD (step 118).

After the reference dot loop is completed, the process of detecting the pair of adjacent dots is completed.
(Specific Example of Process of Selecting Pairs of Reference Dots)

Figure 14:
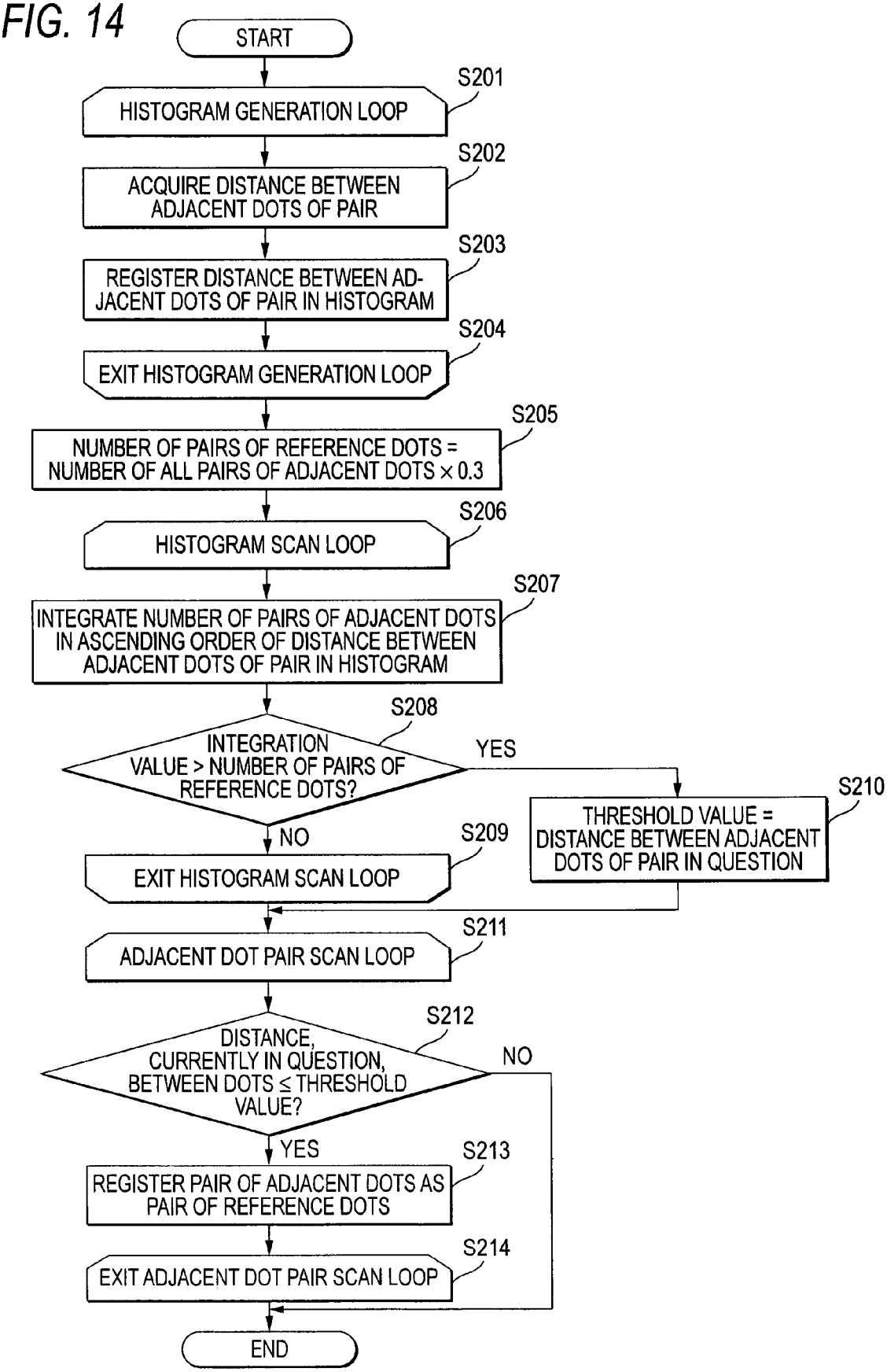
FIG. 14 is a flowchart to show a specific example of selecting pairs of reference dots.

Of the operation of the image processing apparatus 2 (see FIG. 8), FIG. 14 shows a flowchart corresponding to the specific example of selecting pairs of reference dots previously described briefly with reference to FIG. 10.

In the image processing apparatus 2, at first, the dot pair selection section 25 (see FIG. 8) repeats steps 202 and 203 for all the pairs of adjacent dots detected by the adjacent dot pair detection section 24 (see FIG. 8) in order (steps 201 to 204: "Histogram generation loop"). In this histogram generation loop, for example, the dot pair selection section 25 performs the following process for the pair of adjacent dots which is currently in question.

Figure 10A:
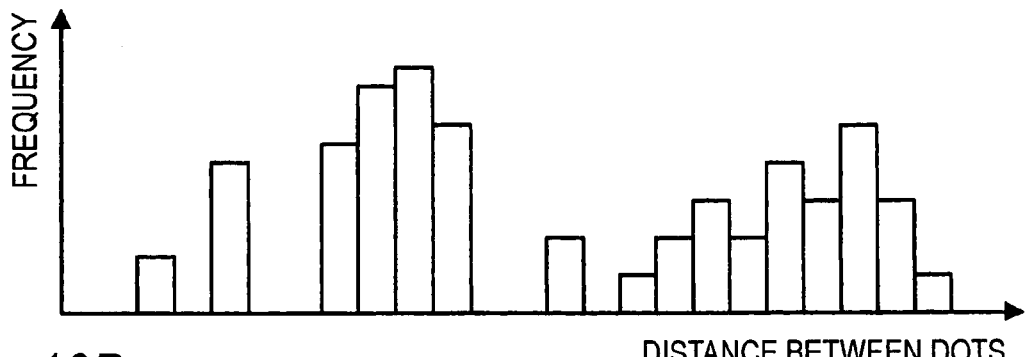
FIG. 10 is a drawing to show an example of a process of selecting a pair of reference dots.
Figure 10B:
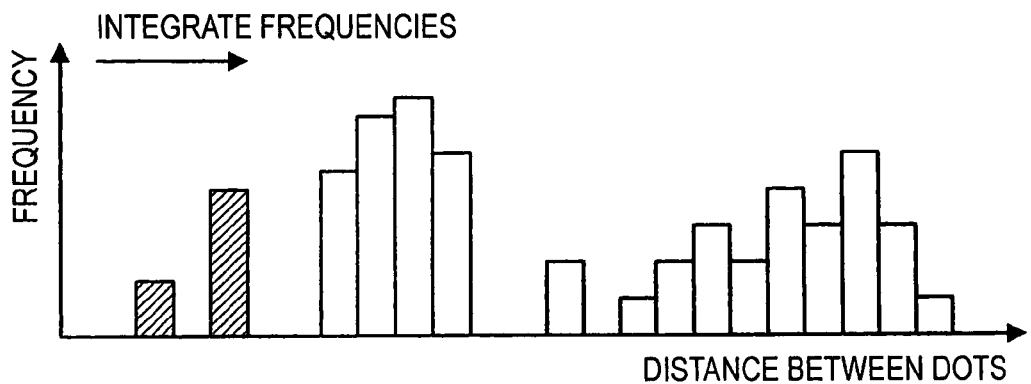
Figure 10C:
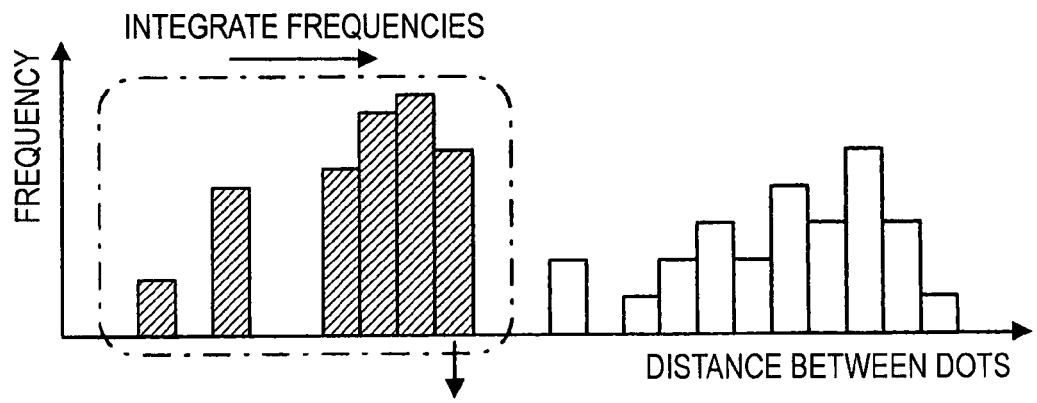

The dot pair selection section 25 acquires a distance between the adjacent dots of the pair (step 202). The dot pair selection section 25 registers the acquired distance between the adjacent dots of the pair in a histogram (step 203). After the histogram generation loop is completed, the dot pair selection section 25 has created a histogram as shown in FIG. 10A, for example. The dot pair selection section 25 sets the value, which is obtained by multiplying a sum of all frequencies in the histogram (number of all the pairs of adjacent dots) by 0.3, to the number of the pairs of reference dots, for example, (step 205). The value 0.3 is determined in terms of design if the number of the kinds of unit code patterns is $_9C_2$ (see FIG. 1). Therefore, if the number of the kinds of unit code patterns changes, the value varies from 0.3 accordingly.

Subsequently, in the image processing apparatus 2, the dot pair selection section 25 repeats steps 207 and 208 for the histogram generated in the histogram generation loop (steps 206 to 209: "Histogram scan loop"). In this histogram scan loop, for example, the dot pair selection section 25 performs the following process.

The dot pair selection section 25 integrates the number of pairs of adjacent dots in ascending order of the distance between adjacent dots of the pair in the histogram (step 207). The dot pair selection section 25 determines as to whether or not the integration value is larger than the number of the pairs of reference dots found at step 205 (step 208). If the integration value is less than the number of the pairs of reference dots, the process goes to step 209 and returns to the histogram generation loop. If the integration value is larger than the number of the pairs of reference dots, the dot pair selection section 25 sets the distance between adjacent dots of the pair in question at that time, as a threshold value (step 210). The histogram generation loop is completed.

In the image processing apparatus 2, the dot pair selection section 25 repeats steps 212 and 213 for the threshold value set at step 210 (steps 211 to 214: "Adjacent dot pair scan loop). In this adjacent dot pair scan loop, for example, the dot pair selection section 25 performs the following process in ascending order of a distance between adjacent dots of the pair in the histogram.

The dot pair selection section 25 determines as to whether or not a distance, currently in question, between dots≦the threshold value (step 212). If the distance, currently in question, between dots≦the threshold value, the dot pair selection section 25 registers a pair of adjacent dots corresponding to the distance currently in question, as a pair of reference dots (step 213). If the dot pair selection section 25 does not determine that the distance, currently in question, between dots≦the threshold value, the adjacent dot pair scan loop is completed and the process is completed.

(Specific Example of Process of Acquiring Inclination Angle of Pair of Reference Dots)

Figure 15:
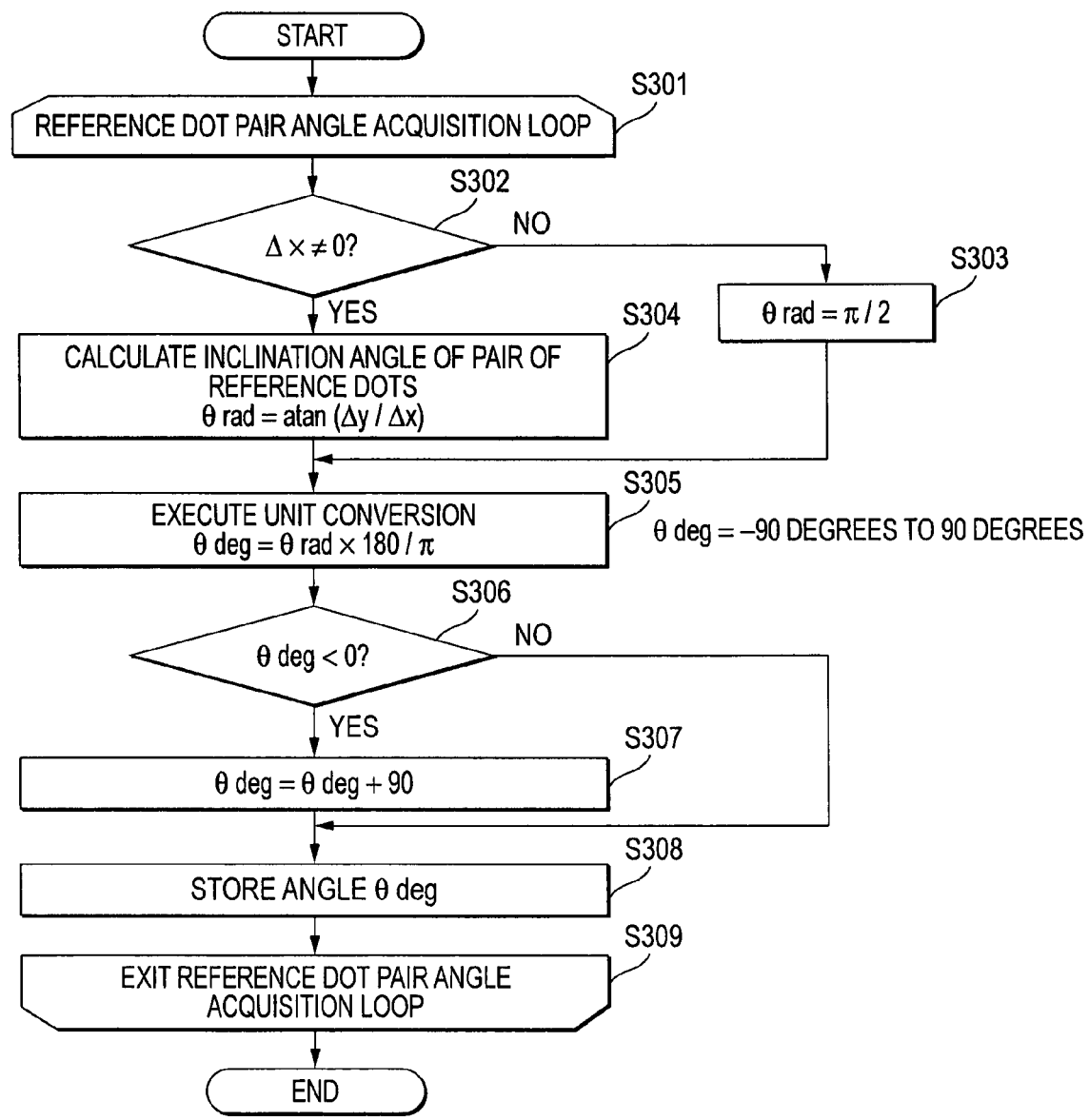
FIG. 15 is a flowchart to show a specific example of a process of acquiring an inclination angle of a pair of reference dots.

Of the operation of the image processing apparatus 2 (see FIG. 8), FIG. 15 shows a flowchart corresponding to the specific example of acquiring the inclination angle of a pair of reference dots previously described briefly with reference to FIGS. 11A and 11B.

In the image processing apparatus 2, at first the angle detection section 26 (see FIG. 8) repeats steps 302 to 308 for all the pairs of reference dots selected by the dot pair selection section 25 (see FIG. 8) in order (steps 301 to 309: "Reference dot pair angle acquisition loop"). In this reference dot pair angle acquisition loop, for example, the angle detection section 26 performs the following process for a pair of reference dots currently in question.

First, the angle detection section 26 determines as to whether or not ΔX is equal to 0 (step 302). If ΔX is equal to 0, the angle detection section 26 sets θrad=π/2 (step 303). Then, the process goes to step 305 described later. If ΔX is not equal to 0, the angle detection section 26 calculates an inclination angle of the pair of reference dots currently in question (step 304). In this case, for example, the angle detection section 26 may calculate the inclination angle using an operational expression of θrad=a tan (ΔY/ΔX) and using ΔX and ΔY described in FIG. 11B. If dots are placed as shown in FIG. 11B or FIG. 11C, θrad becomes a value in the range of −π/2 to π/2. Next, the angle detection section 26 converts the angle units from radians into degrees using an operational expression of θdeg=θrad×180/π (step 305). If dots are placed as shown in FIG. 11B or FIG. 11C, θdeg becomes a value in the range of −90 degrees to 90 degrees.

Then, the angle detection section 26 determines as to whether or not θdeg is less than 0 degree (step 306). If θdeg is equal to or greater than 0 degree, the process goes to step 308 (described later). If θdeg is less than 0 degrees, the angle detection section 26 converts θdeg so that θdeg is in the range of 0 degree to 90 degrees using an operational expression of θdeg=θdeg+90 (step 307). This process corresponds to the angle conversion shown in FIG. 11C, for example the angle detection section 26 stores the found inclination angle (θdeg) of the pair of reference dots currently in question in a memory (step 308).

(Specific Example of Process of Acquiring Rotation Angle of Code Pattern Image)

Figure 16:
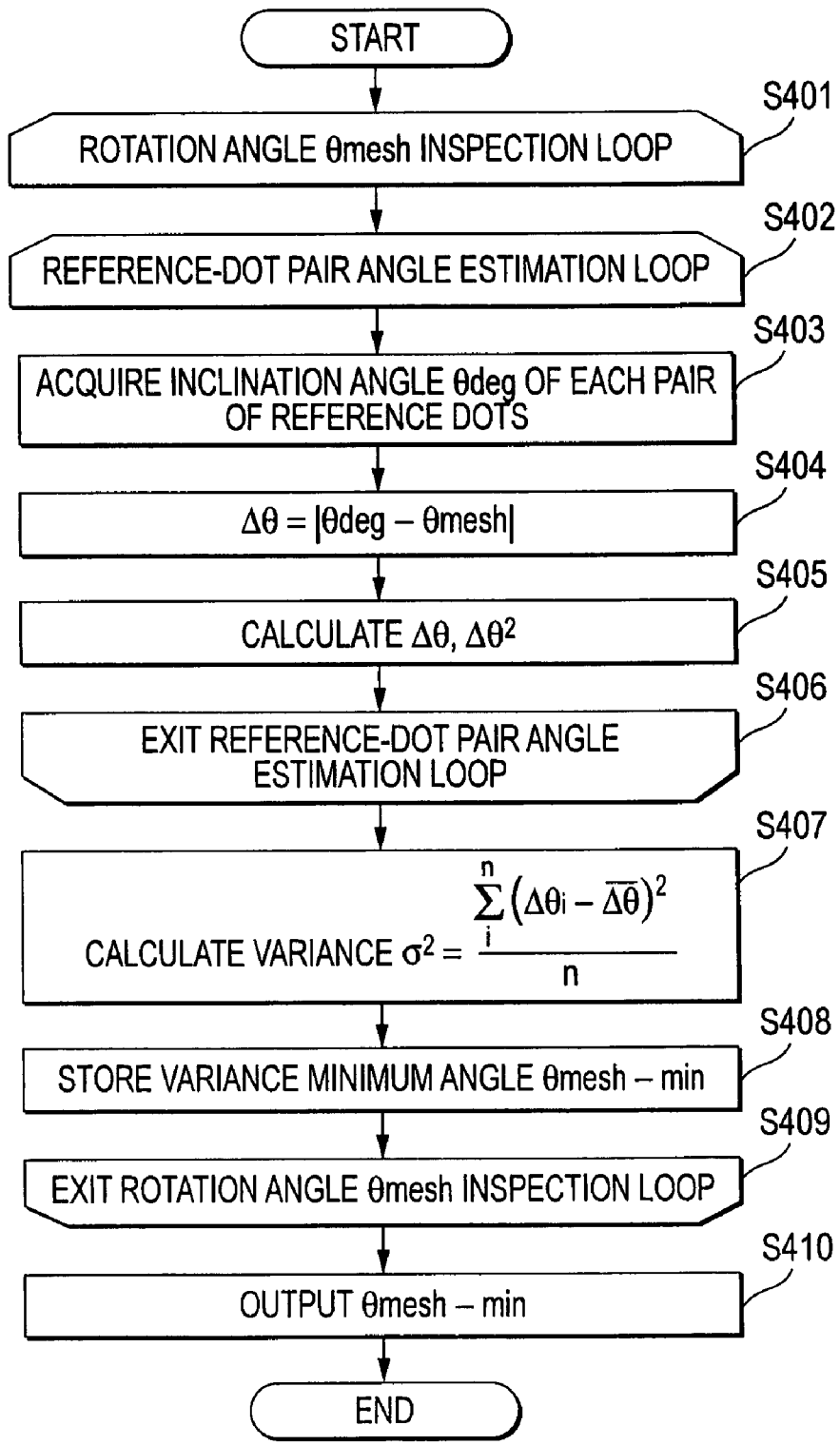
FIG. 16 is a flowchart to show a specific example of a process of acquiring a rotation angle of a code pattern image.

Of the operation of the image processing apparatus 2 (see FIG. 8), FIG. 16 shows a flowchart corresponding to a specific example of acquiring a rotation angle θmesh of the code pattern image.

In the image processing apparatus 2, at first the angle detection section 26 (see FIG. 8) varies a value of the rotation angle θmesh in order (for example, in the range of −90 degrees to 90 degrees) with respect to the inclination angle of the pairs of reference dots (θdeg) stored in the memory in the process of acquiring the inclination angle of the pairs of reference dots (see FIG. 15). The angle detection section 26 repeats steps 402 to 408 (steps 401 to 409: Rotation angle θmesh inspection loop). In this rotation angle θmesh inspection loop, for example, the angle detection section 26 performs the following process for the rotation angle θmesh currently in question.

The angle detection section 26 refers to the rotation angle θmesh in order and repeats steps 403 to 405 (steps 402 to 406: Reference-dot pair angle estimation loop). In this reference-dot pair angle estimation loop, the angle detection section 26 performs the following process for the rotation angle θmesh currently in question.

First, the inclination angle of a pair of reference dots, θdeg, is acquired (step 403). A difference between θdeg and θmesh, referred to as "Δθ," is found using an operational expression of Δθ=|θdeg−θmesh| (step 404). Next, the value of Δθ found for each θdeg and the square value of Δθ are calculated (step 405).

After the reference-dot pair angle estimation loop is completed, variance is calculated using the result of integrating the values of Δθ and the square values of Δθ (step 407). First, an average of the values of Δθ is calculated using the operational expression of $$\overline{\Delta\theta} = \frac{\sum_{i}^{n} \Delta\theta_i}{n}$$

where n denotes the number of the pairs of reference dots. Then, the variance of Δθ is calculated using the operational expression of $$\sigma^2 = \frac{\sum_{i}^{n} (\Delta\theta_i - \overline{\Delta\theta})^2}{n}.$$

This operational expression is transformed into $$\sigma^2 = \frac{\sum_{i}^{n} \Delta\theta_i^2}{n} - \overline{\Delta\theta^2}.$$

Next, the angle detection section 26 determines as to whether or not the rotation angle θmesh currently in question renders the variance of Δθ be minimum based on the calculation results thus far. If so, the angle detection section 26 updates a variance minimum angle θmesh-min (step 408).

Subsequently, after the rotation angle θmesh inspection loop is completed, the angle detection section 26 outputs the value of the variance minimum angle θmesh-min store at step 408 as the rotation angle of the code pattern image (step 410). Then, the process is completed. Accordingly, it can be determined that the direction of the code pattern image is at the θmesh-min rotation position counterclockwise from the reference axis.

(Specific Example of Creation of Virtual Lattice Based on Detected Rotation Angle of Code Pattern Image and Synchronization Process)

Next, an example of a virtual lattice created based on the rotation angle of a code pattern image detected by the exemplary embodiment and a specific example of a synchronization process that uses the virtual lattice will be described with reference to FIG. 17.

FIG. 17A shows an example of the code pattern image. For example, the processes previously described with reference to FIGS. 15 and 16 are performed based on the pairs of reference dots selected from the dot positions representing the code pattern image, so as to acquire the rotation angle of the code pattern image.

FIG. 17B shows an example of a virtual lattice. A direction of the virtual lattice may be estimated from the dot positions. As is obvious from the description given above, when two dots are selected from a code pattern, a distance between the two selected dots is the shortest when the two dots are adjacent side by side in the 0-degree direction or the 90-degree direction, for example. Therefore, a pair of the closest dots (pair of reference dots) is detected from the detected dots, and the rotation angle of the code pattern image can be detected from the direction in which the dot pair directs, and the rotation angle can be adopted as a direction of the virtual lattice.

Here, the direction of the virtual lattice is the rotation angle of the code pattern image acquired from the code pattern image shown in FIG. 17A. An interval between blocks of the virtual lattice is a distance between the reference dots of a pair.

FIG. 17C shows the result of synchronizing the code pattern image (see FIG. 17A) using the virtual lattice shown in FIG. 17B. Here, the virtual lattice is applied to the dots detected from the code pattern image, it is checked as to whether a dot is present or absent in each block of the lattice, and a two-dimensional array is generated from the virtual lattice in such a manner that "0" is set in the block where no dot exists and "1" is set in the block where a dot exists.

(Specific Example of Unit Code Pattern Boundary Detection)

FIG. 18 is a drawing to describe an outline of a process performed by the unit code pattern boundary detection section 29 (see FIG. 8).

Figure 18A:
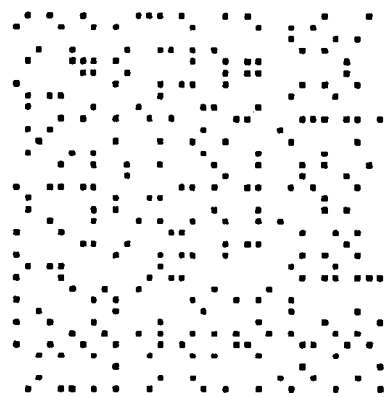
FIG. 18 is a drawing to describe an outline of an example of a process of detecting a boundary between unit code patterns in the exemplary embodiment of the invention.

FIG. 18A shows a code pattern image according to the exemplary embodiment formed of unit code patterns based on $_9C_2$ (see FIG. 1). Although actual boundary detection is applied to the synchronized two-dimensional array formed of bit values "0" and "1" as shown in FIG. 17C, a code pattern image based on dots is used for intuitive understanding of the following description.

Figure 18B:
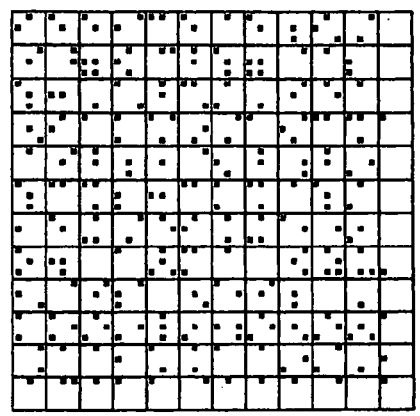
Figure 18C:
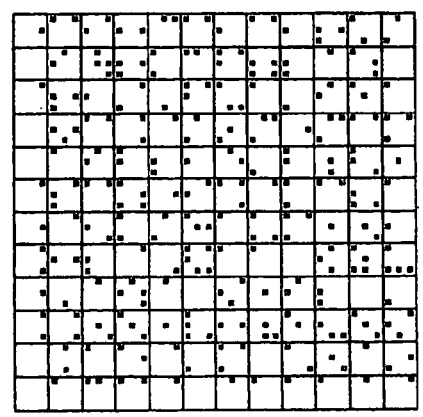
Figure 18D:
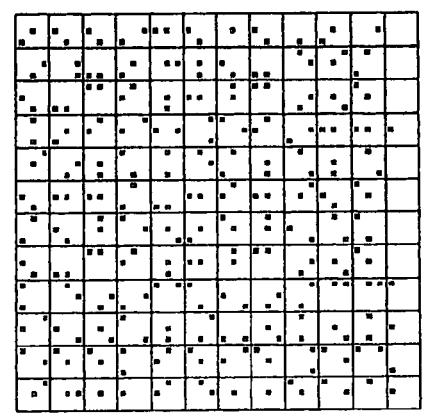

To acquire position information and identification information from the code pattern image as shown in FIG. 18A, at first it is necessary to determine a boundary between the unit code patterns in order to determine the kind of each unit code pattern. FIGS. 18B to 18D show a method of determining a boundary between unit code patterns.

That is, a virtual lattice including plural blocks each having the same size as a unit code pattern (see FIGS. 18B to 18D) is provided and is scanned above the code pattern image. At this time, the number of dots contained in each block is counted and the virtual lattice is fixed at the position where variations in the numbers of dots contained in the blocks become the minimum. The fixed position is the position of the boundary between the unit code patterns.

For example, if the code pattern image is formed using the unit code patterns based on $_9C_2$ (see FIG. 1), the number of dots contained in each block becomes two at the correct position of the virtual lattice shown in FIG. 18D. However, if the position of the virtual lattice is not correct as shown in FIGS. 18B and 18C, the number of dots contained in each block varies in the range of 0 to seven.

For example, in the case of using the unit code patterns based on $_9C_3$, the number of dots contained in each block becomes three at the correct position of the virtual lattice. However, if the position of the virtual lattice is not correct, the number of dots varies.

If the position of the boundary between the unit code patterns is thus determined, each unit code pattern is inspected and a synchronous code is detected. Rotation of the code pattern image is determined according to which of the four kinds of synchronous codes is detected. Further, after the rotation is corrected, a position code and an identification code can be acquired.

(System Configuration Example)

Figure 19:
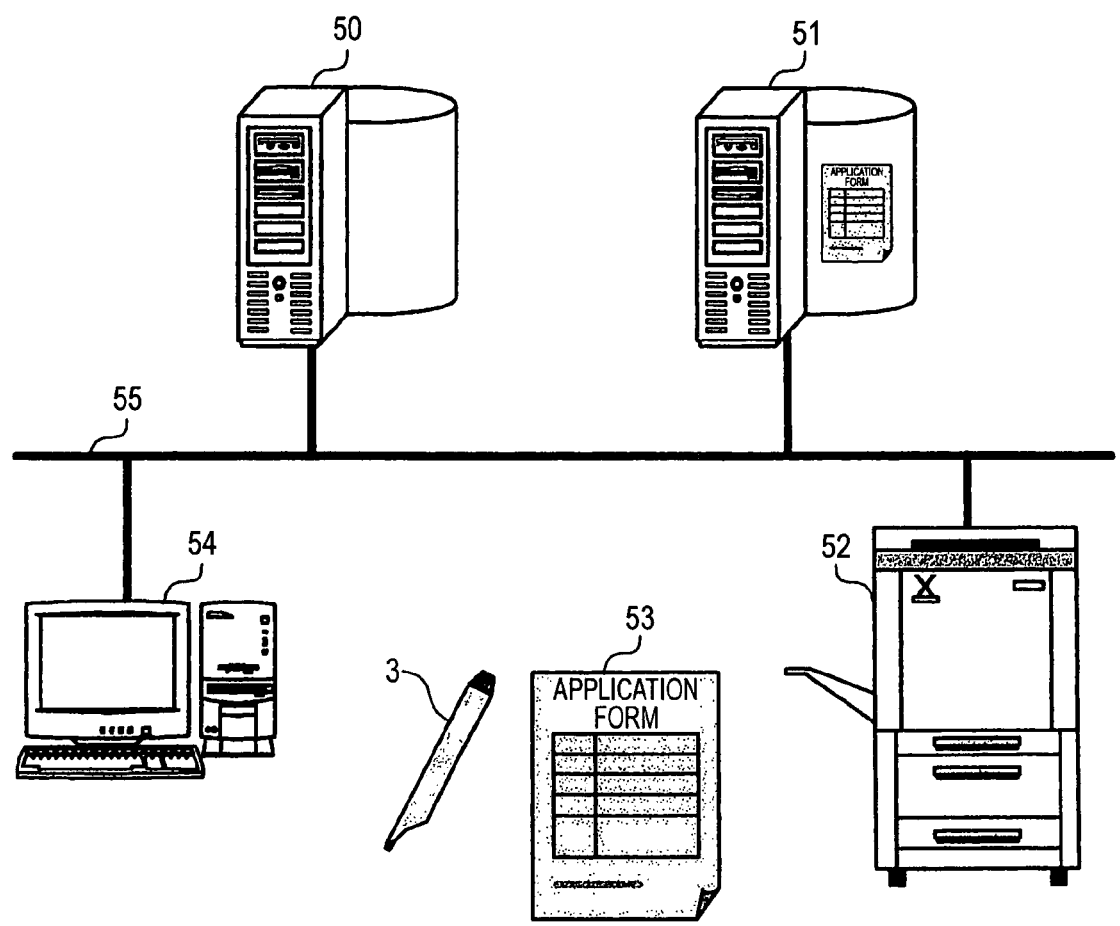
FIG. 19 is a drawing to show a configuration example of a system in the exemplary embodiment of the invention.

FIG. 19 is a drawing to show a configuration example of a system in the exemplary embodiment.

As shown in FIG. 19, the system according to the exemplary embodiment includes a document management server 50, an identification information management server 51, an image formation apparatus 52, and a client 54, which are connected to a network 55. The system further includes a print document 53 and an electronic pen 3.

First, creation of a print document in the system will be described.

The client 54 issues a print command of an electronic document stored in the document management server 50. The document management server 50 transmits the electronic document commanded to be printed and its attribute information (for example, indicating output of five copies of a 10-page electronic document in 2-up form (two pages are printed on a surface of each recording medium)) to the identification information management server 51.

The identification information management server 51 performs a process of assigning identification information to the electronic document to be printed, registering the identification information and the electronic document, and printing the electronic document. The identification information management server 51 adds different identification information to each recording medium on which an image will be printed. Therefore, for example, in the case of making 5 copies of the 10-page electronic document in 2-up form, 25 pieces of identification information (10 pages/2×5=25) are generated. The generated identification information is stored in a database in association with the received attribute information of the electronic document (the storage location, the print setting, layout information, etc.).

Next, a print description language (PDL) is generated from the received electronic document and the generated identification information and is transmitted to the image formation apparatus 52. The PDL contains a code pattern image generated from the identification information, for example. In the example, the code pattern image is generated in the identification information management server 51, but may also be generated in the image formation apparatus 52. In this case, the identification information is added to the PDL generated from the electronic document and is transmitted to the image formation apparatus 52, which then generates a code pattern image from the identification information.

The image formation apparatus 52 generates an image from the received PDL and forms the image on a recording medium as a print image.

Subsequently, the process of acquiring information written on a recording medium with the electronic pen 3 will be described.

When writing is executed on a recording medium with the electronic pen 3, a code pattern image formed on the recording medium is captured with the electronic pen 3 and is input into the electronic pen 3. The code pattern image is processed in the electronic pen 3, and position information and identification information contained in the code pattern image are acquired. The electronic pen 3 reads an image at a rate of about 70 fps to 100 fps (frames per second) and thus can acquire plural pieces of position information and identification information by single writing operation.

As the identification information, the same information is embedded independently of the position on a recording medium. Therefore, decision by majority can be made for plural pieces of identification information for enhancing the reliability of the identification information. The position information varies from one position on a recording medium to another. If acquisition of position information results in failure, for example, continuity of the position (coordinates) and the position adjacent to that position is checked, whereby position information whose acquisition results in failure can be detected and complemented.

Plural pieces of position information are stored in an internal memory of the electronic pen 3, for example, as writing information together with the identification information. The client 54 acquires the writing information from the electronic pen 3 and transmits the writing information to the identification information management server 51. The identification information management server 51 searches for the attribute information of the corresponding electronic document based on the identification information contained in the received writing information. When the identification information management server 51 detects the attribute information of the corresponding electronic document, the identification information management server 51 accesses the original electronic document and generates an electronic document to reflect the writing information (already written electronic document) from the original electronic document.

Before the process, the identification information management server 51 may determine as to whether or not an already written electronic document exists. When the identification information management server 51 detects an already written electronic document, the identification information management server 51 may reflect the current acquired writing information on the already written electronic document. Further, the identification information management server 51 may inquire of the client 54 whether to generate a new already written electronic document or to add writing information to the detected already written electronic document. The already written electronic document can be easily acquired as the attribute information of the already written electronic document (storage location) is previously registered in the identification information management server 51.

The already written electronic document is generated in a format in which the portion corresponding to the original electronic document can be edited, for example. Writing information with the electronic pen 3 can be later added to such an already written electronic document although the portion of the electronic document cannot be edited. For example, after information written on a recording medium is once electronized, when information is again written on the same recording medium with the electronic pen 3, the added writing information can be added onto the already written electronic document.

(Configuration of Electronic Pen)

Figure 20:
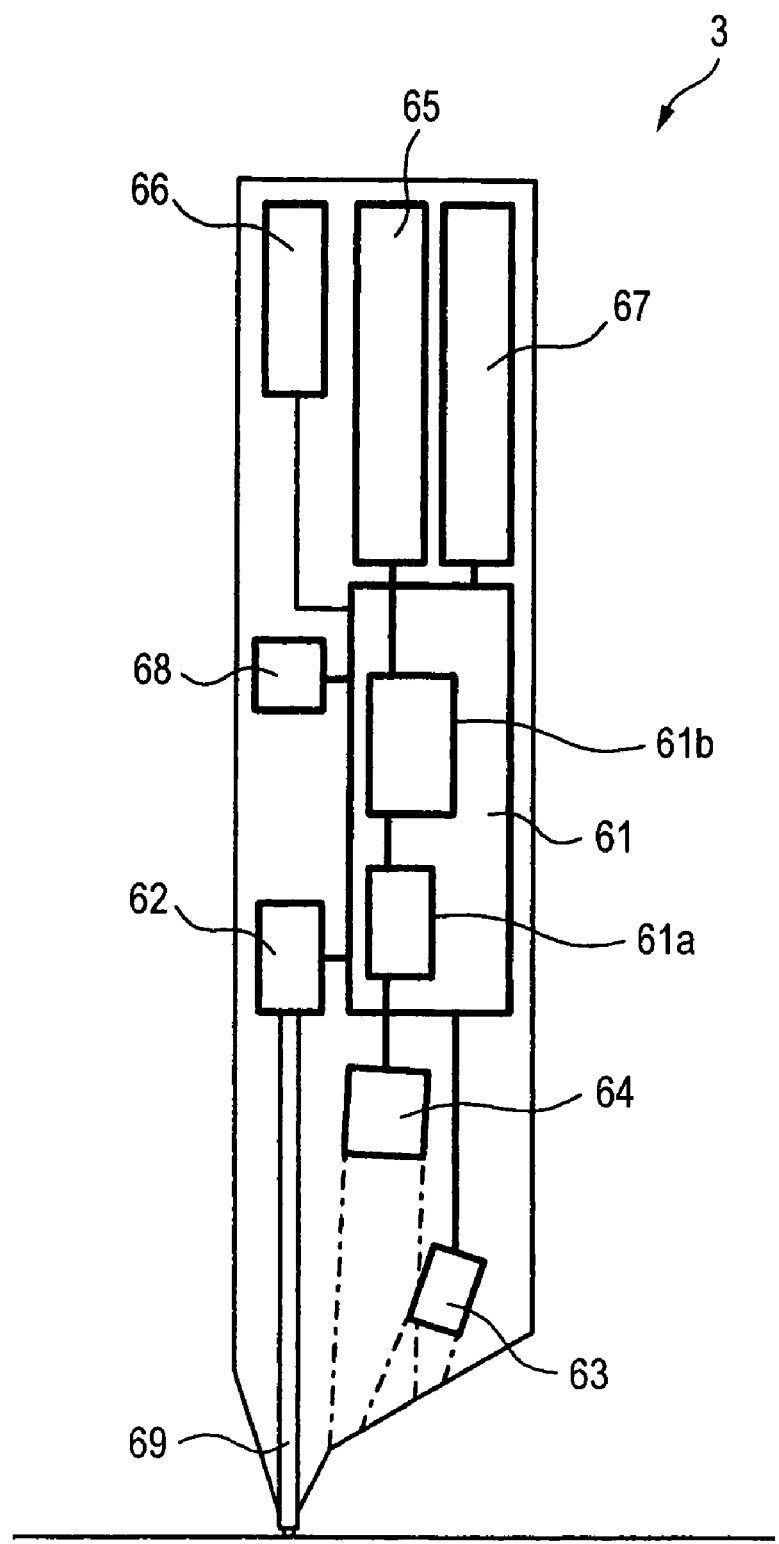
FIG. 20 is a drawing to show an example of the mechanism of an electronic pen used in the exemplary embodiment of the invention.

FIG. 20 is a drawing to show an example of the mechanism of the electronic pen 3 (see FIG. 19) that can be used for picking up a code pattern image in the exemplary embodiment. The electronic pen 3 will be described. It may function as the image processing apparatus 2 (see FIG. 8).

As shown in the figure, the electronic pen 3 includes a control circuit 61 for controlling the operation of the whole pen. The control circuit 61 includes an image processing section 61a for processing a code pattern image detected from an acquired image and a data processing section 61b for extracting identification information and position information from the processing result of the image processing section 61a.

A pressure sensor 62 for detecting the writing operation with the electronic pen 3 according to the pressure applied to a pen tip 69 is connected to the control circuit 61. An infrared LED 63 for applying infrared radiation onto a medium and an infrared CMOS 64 for inputting an image are also connected to the control circuit 61. Further, also connected to the control circuit 61 are information memory 65 for storing identification information and position information, a communication circuit 66 for communicating with an external unit, a battery 67 for driving the pen, and pen ID memory 68 for storing identification information of the pen (pen ID).

Subsequently, an outline of the operation of the electronic pen 3 will be described.

When writing is performed with the electronic pen 3, the pressure sensor 62 connected to the pen tip 69 detects the writing operation. Accordingly, the infrared LED 63 goes on and the infrared CMOS 64 picks up an image on a recording medium with a CMOS sensor. In this case, the image (code pattern image) is formed using an invisible image formation material (ink) having an absorption wavelength in an infrared region.

To suppress power consumption, the infrared LED 63 may go on like a pulse in synchronization with the shutter timing of the CMOS sensor.

The infrared CMOS 64 can use a CMOS sensor of global shutter system capable of transferring a picked-up image at the same time, for example. A CMOS sensor having sensitivity in an infrared region can be used, for example. To decrease the effect of disturbance, a visible light cut filter may be placed on the full face of the CMOS sensor. The CMOS sensor can pick up an image in cycles of about 70 fps to 100 fps, for example. The imaging device is not limited to the CMOS sensor; any other imaging device such as a CCD can also be used.

When the control circuit 61 acquires the image thus picked up, it acquires the code pattern image from the picked-up image. The control circuit 61 can decode the code pattern image to acquire the identification information and the position information embedded in the code pattern image.

The description of the exemplary embodiment is now complete. The exemplary embodiment has been described by way of example.

For example, to acquire the rotation angle of a code pattern image, the angles of the pairs of reference dots in the proximity of the reference axis X need not necessarily be converted as they are collected in the proximity of the reference axis Y. The angles of the pairs of reference dots may be collected in the proximity of the reference axis X for acquiring the rotation angle of the code pattern image. The angles of the pairs of reference dots need not necessarily be collected on either reference axis of the reference axis X and the reference axis Y. In this case, for example, the rotation angle of the code pattern image may be found separately in the two directions of the reference axis X and the reference axis Y.

In the exemplary embodiment, the infrared CMOS 64 (see FIG. 20) of the electronic pen 3 (see FIG. 20) picks up a code pattern image, but the invention is not limited to the mode. Any may be used if it is an image pickup unit including a function of applying infrared light onto a recording medium and a read function having sensitivity in an infrared region (for example, a scanner). Further, the code pattern image is formed using an invisible image formation material having an absorption wavelength in the infrared region, but the invention is not limited to the mode. Any may be used to form the code pattern image on a recording medium if it is an image formation material which is invisible if it is formed on the recording medium and enables an image to be picked up by any image pickup method.

Further, in the exemplary embodiment, the electronic pen 3 (see FIG. 20) may function as the image processing apparatus 2 (see FIG. 8), but the invention is not limited to the mode. Information of a picked-up code pattern image may be sent through the communication circuit 66 (see FIG. 20) to an external computer such as the client 54 (see FIG. 19), and the above-described image processing may be performed in the computer.

In the exemplary embodiment, to create a print document, a code pattern image is generated in the identification information management server 51 or the image formation apparatus 52, but can also be generated in the document management server 50. In this case, the document management server 50 transmits only the attribute information of an electronic document to the identification information management server 51. The identification information management server 51 calculates the necessary number of pieces of identification information from the received attribute information, associates the received attribute information and the identification information to be issued with each other, and transmits the identification information to the document management server 50. The document management server 50 generates a code pattern image based on the received identification information and transmits the code pattern image to the image formation apparatus 52 together with electronic document information.

Any information can also be used as the identification information. For example, 128-bit UUID or ID generated from the server's network address and the print time can also be used. If the generated identification information exceeds 60 bits of the code block capacity, for example, the information can be divided for storage according to a method as already described.

Further, in the exemplary embodiment, whenever information written on a recording medium with the electronic pen 3 (see FIG. 20) is acquired, the identification information management server 51 (see FIG. 19) generates an electronic document to reflect the writing information from the original electronic document, but the invention is not limited to the mode.

Before the process, the identification information management server 51 may determine whether or not an already written electronic document exists and when the identification information management server 51 detects an already written electronic document, it may reflect the current acquired writing information on the already written electronic document. Further, the identification information management server 51 may inquire of the client 54 whether to generate a new already written electronic document or to add writing information to the detected already written electronic document. The already written electronic document can be easily acquired as the attribute information of the already written electronic document (storage location) is previously registered in the identification information management server 51.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus having a CPU, comprising:

an image acquisition section of the CPU that acquires a code pattern image from a surface of a recording medium on which the code pattern is formed, the code pattern in which N unit images are selectively placed in M reference positions that are arranged at predetermined intervals in two directions orthogonal to each other where $M \geq 4$ and $2 \leq N < M$;

a combination detection section of the CPU that detects pairs of the unit images based on the predetermined intervals and respective positions of the unit images contained in the code pattern image acquired by the image acquisition section; and an angle detection section of the CPU that detects an arbitrary rotation angle of the code pattern image with respect to a predetermined reference axis based on an inclination of a line, with respect to the predetermined reference axis, connecting the unit images of each pair detected by the combination detection section, wherein the combination detection section detects plural pairs of the unit images based on a distribution of distances from each of the unit images to another unit image closest thereto.

2. The apparatus according to claim 1, wherein:

the angle detection section determines an angle representing the inclination of the line connecting the unit images of each pair with respect to the predetermined reference axis in a range of −90 degrees to 90 degrees, the angle detection section adds 90 degrees to angles that represent the inclinations and are less than 0 degree, and the angle detection section finds θmesh as the rotation angle of the code pattern image, θmesh that renders σ defined by the following expression be minimum, $$\sigma^2 = \frac{\sum_i^n (\Delta\theta_i - \overline{\Delta\theta})^2}{n}$$

where θdeg$_i$ denotes the inclination of the line connecting the unit images of each pair, n denotes number of the pairs of unit images and $\Delta\theta_i = |\theta deg_i - \theta mesh|$.

3. The apparatus according to claim 1, further comprising:

a two-dimensional array generation section that associates the positions where the unit images are placed with a virtual lattice that is generated based on an interval between the unit images of each pair and the arbitrary rotation angle of the code pattern image, the two-dimensional array generation section that generates a two-dimensional array in accordance with presence or absence of the unit image in each block of the virtual lattice;

a block detection section that detects a plurality of blocks that form the code pattern image and represent predetermined information, based on the two-dimensional array generated by the two-dimensional array generation section; and an information acquisition section that acquires the predetermined information based on the plurality of blocks detected by the block detection section.

4. The apparatus according to claim 3, wherein the code pattern image contains at least one of (i) identification information that identifies the recording medium or document information formed on the recording medium and (ii) position information that identifies positions on the recording medium or positions of the document information formed on the recording medium as the predetermined information.

5. The apparatus according to claim 1, wherein:

the unit images are formed with an invisible image formation material having an absorption wavelength in an infrared region, and the image acquisition section acquires the code pattern image by applying infrared light to the recording medium.

6. A non-transitory computer readable medium storing a program causing a computer to execute image processing, the image processing comprising:

acquiring a code pattern image from a surface of a recording medium on which the code pattern is formed, the code pattern in which N unit images are selectively placed in M reference positions that are arranged at predetermined intervals in two directions orthogonal to each other where M≧4 and 2≦N<M;

detecting pairs of the unit images based on the predetermined intervals and respective positions of the unit images contained in the acquired code pattern image; and detecting an arbitrary rotation angle of the code pattern image with respect to a predetermined reference axis based on an inclination of a line, with respect to the predetermined reference axis, connecting the unit images of each detected pair, wherein the detecting of the pairs of the unit images detects the plurality of pairs based on a distribution of distances from each of the unit images to another unit image closest thereto.

7. The computer readable medium according to claim 6, wherein the detecting of the arbitrary rotation angle comprises:

determining an angle representing the inclination of the line connecting the unit images of each pair with respect to the predetermined reference axis in a range of −90 degrees to 90 degrees;

adding 90 degrees to angles that represent the inclinations and are less than 0 degree, and finding θmesh as the arbitrary rotation angle of the code pattern image, θmesh that renders σ defined by the following expression be minimum, $$\sigma = \sum_i^n (\theta deg_i - \theta mesh)^2$$

where θdegi denotes the inclination of the line connecting the unit images of each pair and n denotes number of the pairs of unit images.

8. The computer readable medium according to claim 6, further comprising:

associating the positions where the unit images are placed with a virtual lattice that is generated based on an interval between the unit images of each pair and the arbitrary rotation angle of the code pattern image;

generating a two-dimensional array in accordance with presence or absence of the unit image in each block of the virtual lattice;

detecting a plurality of blocks that form the code pattern image and represent predetermined information, based on the generated two-dimensional array; and acquiring the predetermined information based on the plurality of detected blocks.

* * * * *